(12) United States Patent
Choi et al.

(10) Patent No.: US 10,161,644 B2
(45) Date of Patent: Dec. 25, 2018

(54) APPARATUS FOR BOTH HUMIDIFICATION AND AIR CLEANING

(71) Applicant: LG ELECTRONICS INC., Seoul (KR)

(72) Inventors: Jieun Choi, Seoul (KR); Inho Choi, Seoul (KR); Hyungho Park, Seoul (KR); Sanghyuk Son, Seoul (KR); Kyoungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/338,093

(22) Filed: Oct. 28, 2016

(65) Prior Publication Data
US 2017/0122591 A1 May 4, 2017

Related U.S. Application Data

(60) Provisional application No. 62/248,463, filed on Oct. 30, 2015.

(30) Foreign Application Priority Data

Nov. 7, 2015 (KR) .......................... 10-2015-0156257
Dec. 24, 2015 (KR) .......................... 10-2015-0185869
Oct. 26, 2016 (KR) .......................... 10-2016-0139828

(51) Int. Cl.
*B01F 3/04* (2006.01)
*F24F 6/00* (2006.01)
(Continued)

(52) U.S. Cl.
CPC ............... *F24F 6/04* (2013.01); *B01D 46/10* (2013.01); *B01F 3/04028* (2013.01);
(Continued)

(58) Field of Classification Search
CPC .... B01F 3/04; B01F 3/04007; B01F 3/04021; B01F 3/04028; B01F 3/04085; F24F 6/14; F24F 6/16
(Continued)

(56) References Cited

U.S. PATENT DOCUMENTS 1,994,912 A * 3/1935 Hochstetter ......... B01F 3/04035
261/91
5,213,595 A 5/1993 Kim

FOREIGN PATENT DOCUMENTS

FR 1394804 A 4/1965
GB 934432 A 8/1963
(Continued)

*Primary Examiner* — Robert A Hopkins
(74) *Attorney, Agent, or Firm* — Dentons US LLP

(57) ABSTRACT

Provided is a humidification and air cleaning apparatus. The humidification and cleaning apparatus includes: a water tank storing water; an air wash inlet disposed in the water tank and communicating the inside of the water tank with the outside thereof; a water tank humidification medium covering the air wash inlet, formed of a material absorbing water, and humidifying air passing the air wash inlet; a watering housing disposed inside the water tank, suctioning water of the water tank thereinto, pumping the suctioned water to an upper side when rotating, and spraying the pumped water; and a watering motor providing a torque to the watering housing. Here, the water tank humidification medium is spaced from water stored in the water tank and is wetted by water sprayed from the watering unit.

17 Claims, 20 Drawing Sheets

(51) Int. Cl.
    *F24F 6/04*        (2006.01)
    *F24F 3/16*        (2006.01)
    *F24F 6/14*        (2006.01)
    *B01D 46/10*      (2006.01)
    *F24F 6/16*        (2006.01)
    *F24F 13/20*      (2006.01)
    *F24F 13/28*      (2006.01)

(52) U.S. Cl.
    CPC ............ *B01F 3/04085* (2013.01); *F24F 3/16* (2013.01); *F24F 6/14* (2013.01); *F24F 6/16* (2013.01); *F24F 13/20* (2013.01); *F24F 13/28* (2013.01); *B01D 2279/50* (2013.01); *F24F 2006/008* (2013.01); *F24F 2006/046* (2013.01); *Y02B 30/545* (2013.01)

(58) Field of Classification Search
    USPC .................................................. 261/72.1, 83
    See application file for complete search history.

(56) References Cited

FOREIGN PATENT DOCUMENTS

| | | |
|---|---|---|
| JP | 55-150941 U | 10/1980 |
| JP | 11-24759 A | 1/1999 |
| JP | 2005-274041 A | 10/2005 |
| JP | 2008-145035 A | 6/2008 |
| KR | 20-1990-0011123 Y1 | 12/1990 |
| KR | 10-2012-0076284 A | 7/2012 |

\* cited by examiner

APPARATUS FOR BOTH HUMIDIFICATION AND AIR CLEANING

CROSS-REFERENCE TO RELATED APPLICATIONS

This U.S. non-provisional patent application claims priority under 35 U.S.C. § 119 of U.S. Provisional Application No. 62/248,463, filed on Oct. 30, 2015, Korean Patent Application No. 10-2015-0156257, filed on Nov. 7, 2015, Korean Patent Application No. 10-2015-0185869, filed on Dec. 24, 2015 and Korean Patent Application No. 10-2016-0139828, filed on Oct. 26, 2016, the entire contents of which are hereby incorporated by reference.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges it into air and a natural evaporation type that evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter.

However, since a typical humidifier is used only in a low humidity season and an air cleaner has no humidification function, a user needs to purchase both products.

Also, since a typical humidifier has an air cleaning function as an additional function in addition to a humidification function as a main function, the air cleaning function is weak.

Furthermore, there is a limitation in that a typical humidifier or air cleaner cannot separately operate the humidification or air cleaning function.

SUMMARY OF THE INVENTION

The present invention provides a humidification and air cleaning apparatus which can separately operate a humidification function and an air cleaning function.

The present invention also provides a humidification and air cleaning apparatus which allows a user to check water drops formed on a humidification flow passage with his/her eyes and to intuitively know the humidification state.

The present invention also provides a humidification and air cleaning apparatus which includes a structure where a humidification medium does not soak in water.

The present invention also provides a humidification and air cleaning apparatus which can maintain a humidification medium at a dry state while not operating.

The present invention also provides a humidification and air cleaning apparatus which can quickly dry a water tank humidification medium by optimizing the location of the water tank humidification medium.

The present invention also provides a humidification and air cleaning apparatus which can minimize noise of dropping water from a water tank humidification medium.

The present invention also provides a humidification and air cleaning apparatus which is provided with dropping water preventing flow passage disposed in a water tank humidification medium housing.

The objectives of the present invention are not limited to the above-mentioned objectives, and other objectives that are not mentioned will be clearly understood by persons skilled in the art from the following description.

Embodiments of the present invention provide humidification and air cleaning apparatuses comprising: a water tank storing water; an air wash inlet disposed in the water tank and communicating the inside of the water tank with the outside thereof; a water tank humidification medium covering the air wash inlet, formed of a material absorbing water, and humidifying air passing the air wash inlet; a watering housing disposed inside the water tank, suctioning water of the water tank thereinto, pumping the suctioned water to an upper side when rotating, and spraying the pumped water; and a watering motor providing a torque to the watering housing, wherein the water tank humidification medium is spaced from water stored in the water tank and is wetted by water sprayed from the watering unit.

In some embodiments, air passing the air wash inlet may be pressurized so as to flow from the outside to the inside of the water tank.

In some embodiments, the air wash inlet may be formed in circumference of the water tank, and the water tank humidification medium may cover the whole of the air wash inlet.

In some embodiments, the water tank humidification medium may have a lower end thereof located inside the water tank.

In some embodiments, the water tank humidification medium may have an upper end thereof located outside the water tank, and may have a lower end thereof located inside the water tank.

In some embodiments, the water tank humidification medium may have a lower end thereof overlapping the water tank.

In some embodiments, the humidification and air cleaning apparatus may further include a water tank humidification medium housing in which the water tank humidification medium is disposed, wherein the water tank humidification medium is disposed separably from the water tank.

In some embodiments, the water tank humidification medium housing may have a lower end thereof located inside the water tank.

In some embodiments, the water tank humidification medium housing may have an upper end thereof located outside the water tank, and may have a lower end thereof located inside the water tank.

In some embodiments, the water tank humidification medium housing may have a lower end thereof overlapping the water tank.

In some embodiments, the humidification and air cleaning apparatus may further include a visual body forming at least a portion of the water tank and formed of a transparent material, wherein: the watering housing further comprises a nozzle spraying water to an inner side surface of the visual body; the air wash inlet is disposed under the visual body; water flowing down along the visual body wets the water tank humidification medium; and air passing the air wash inlet is humidified through the water tank humidification medium that is wetted.

In some embodiments, the water tank humidification medium housing may be separably placed on the visual body.

In some embodiments, the visual body may further include a reservoir temporarily storing water that flows down, and the water tank humidification medium housing may be placed on the reservoir.

In some embodiments, the water tank humidification medium housing may further include a guide, and the guide may be disposed over the reservoir and may incline toward the inside of the water tank.

In some embodiments, the water tank humidification medium housing may include: an inner medium frame disposed inside the water tank humidification medium and supporting the water tank humidification medium; an outer medium frame disposed outside the water tank humidification medium and supporting the water tank humidification medium; an inner medium inlet formed in the inner medium frame and allowing air to pass therethrough; and an outer medium inlet formed in the outer medium frame and allowing air to pass therethrough, and air passing through the water tank humidification medium sequentially passes the air wash inlet, the outer medium inlet, and the inner medium inlet.

In some embodiments, when the water tank is full of water, a lower end of the water tank humidification medium may be located higher than a water surface of the water tank.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
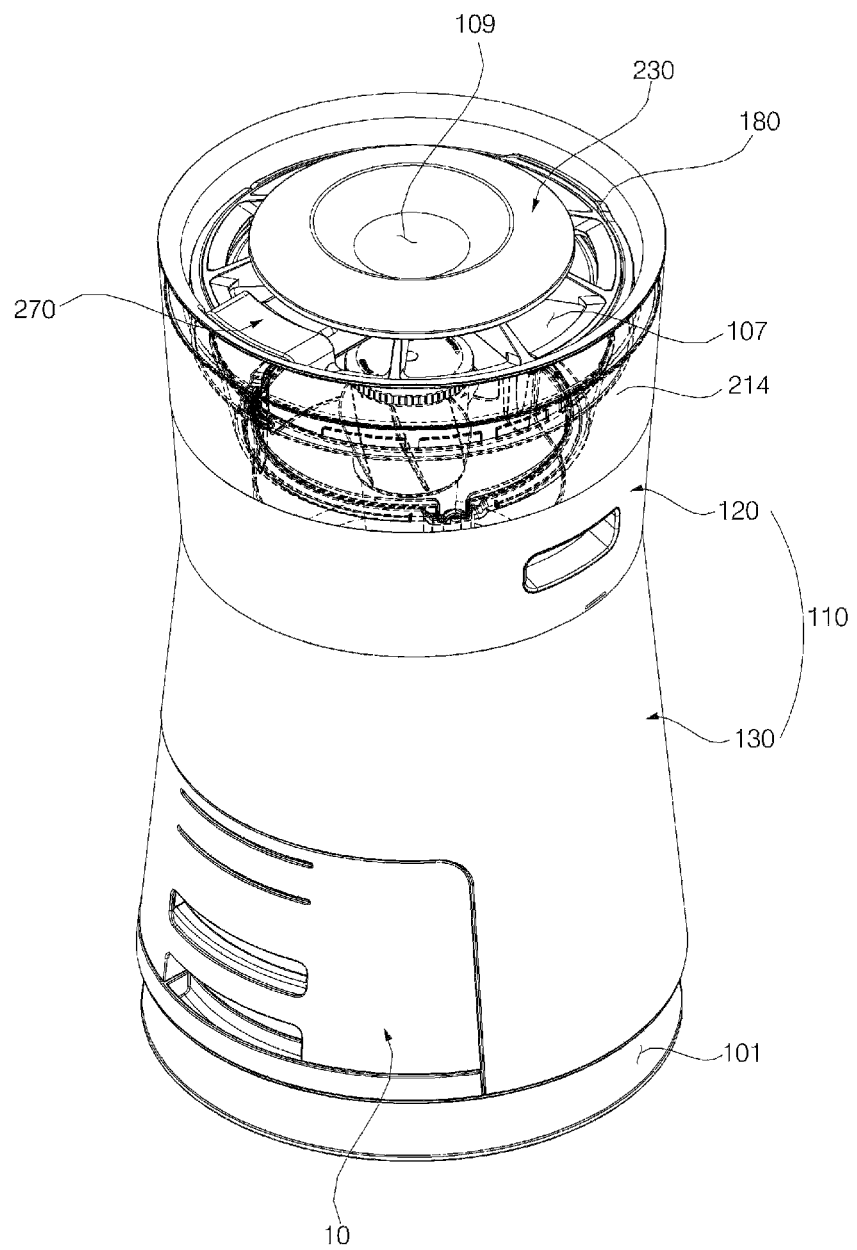
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, exemplary embodiments of the present invention will be described in detail with reference to the accompanying drawings.

Figure 2:
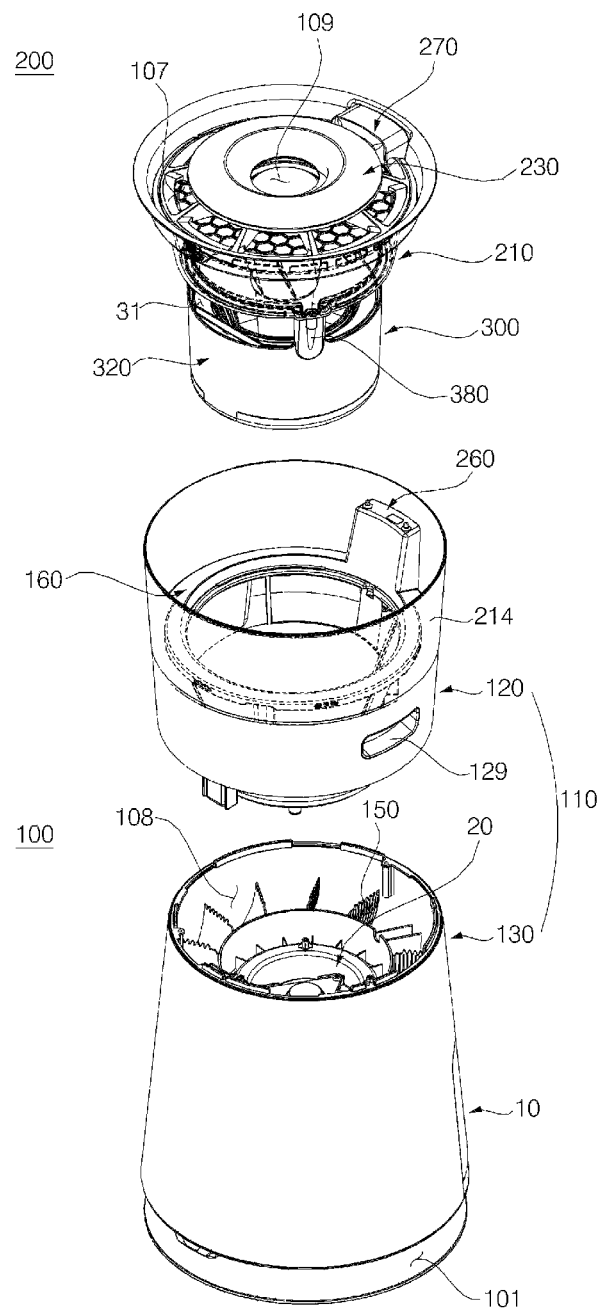
FIG. 2 is an exploded perspective view of FIG. 1.
Figure 3:
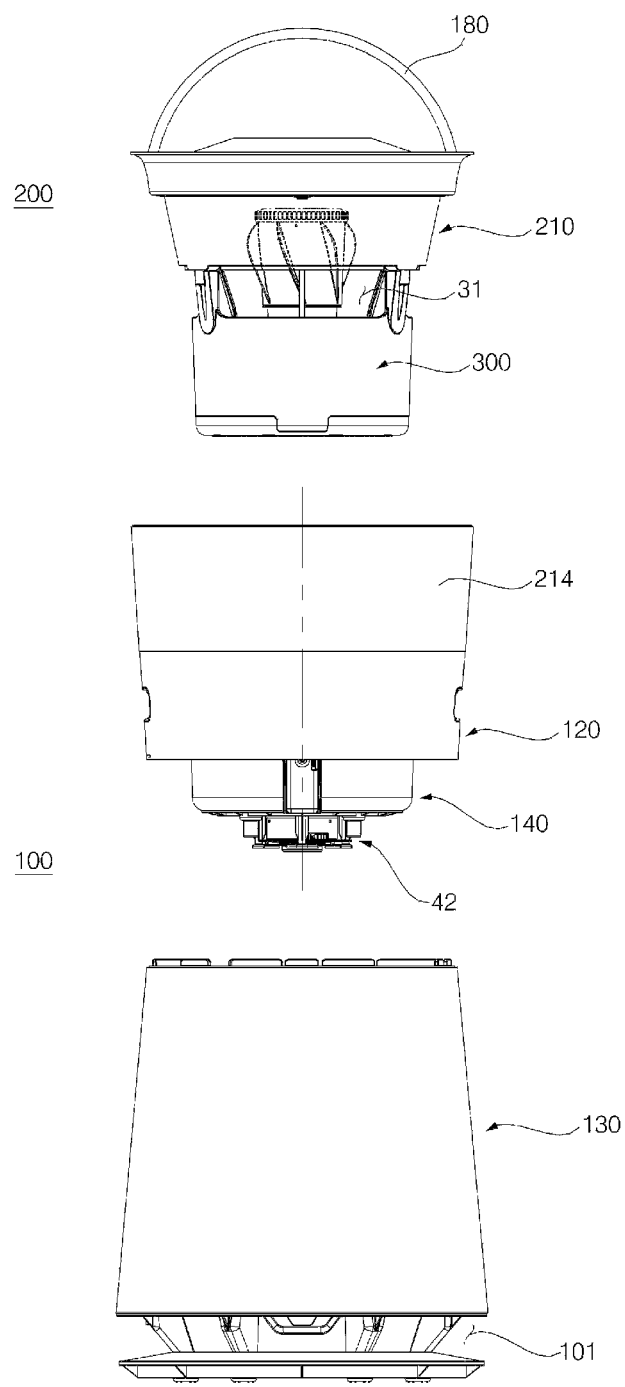
FIG. 3 is an exploded front view of FIG. 1.
Figure 4:
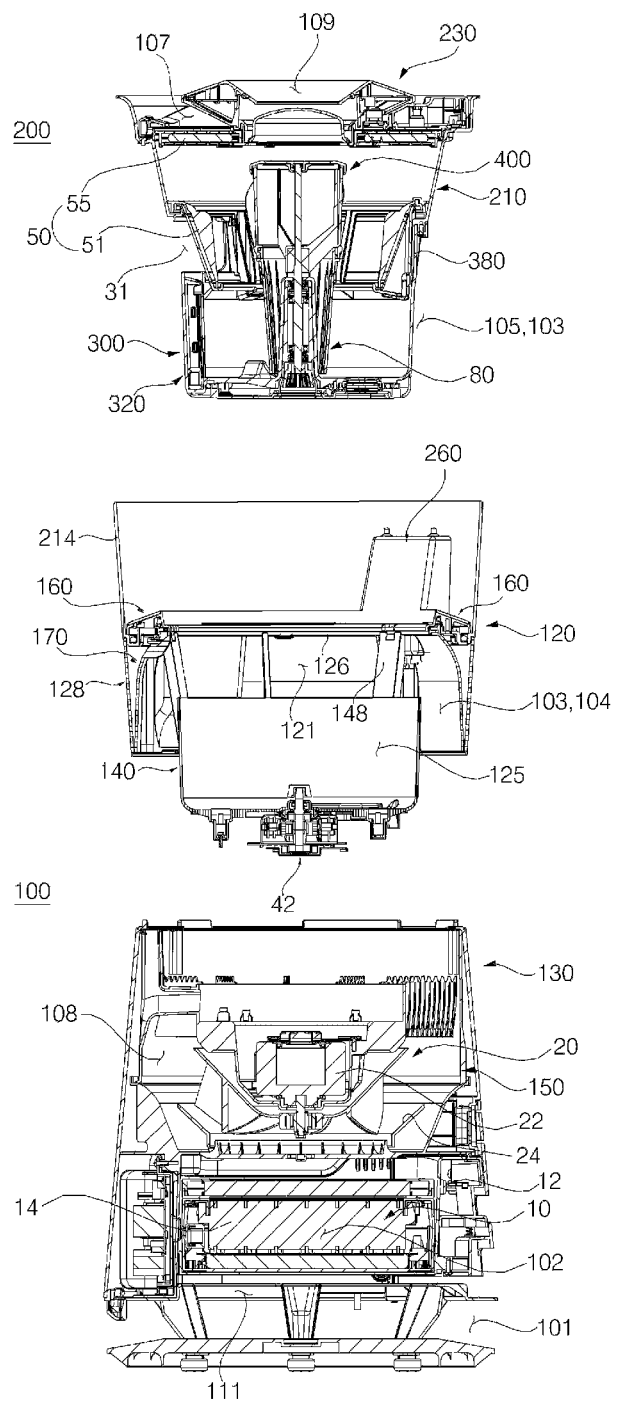
FIG. 4 is an exploded cross-sectional view of FIG. 3.
Figure 5:
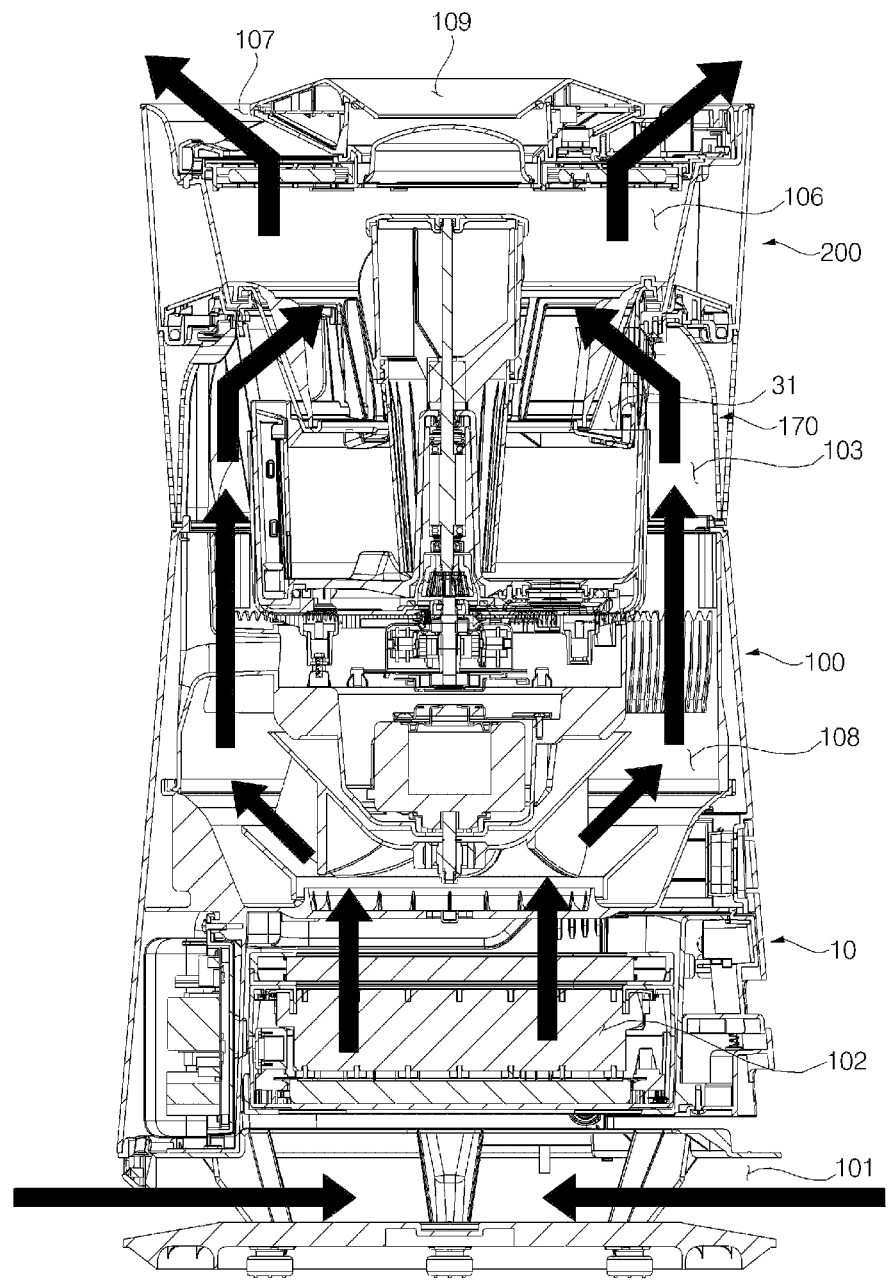
FIG. 5 is a view illustrating an air flow of the humidification and air cleaning apparatus according to the first embodiment of the present invention.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3. FIG. 5 is a perspective view illustrating an air flow of the humidification and air cleaning apparatus according to the first embodiment of the present invention.

A humidification and air cleaning apparatus according to an embodiment of the present invention may include an air clean module 100 and an air wash module 200 disposed over the air clean module 100.

The air clean module 100 may take in and filter external air, and may provide filtered air to the air wash module 200. The air wash module 200 may be supplied with filtered air, may perform humidification to provide moisture, and may discharge humidified air to the outside.

The air wash module 200 may include a water tank 300 for storing water. The water tank 300 may be separable from the air clean module 100 when the air wash module 200 is separated. The air wash module 200 may be disposed over the air clean module 100.

A user can separate the air wash module 200 from the air clean module 100, and can clean the air wash module 200 that is separated. A user may also clean the inside of the air clean module 100 from which the air wash module 200 is separated. When the air wash module 200 is separated, the upper surface of the air clean module 100 may be opened to a user.

The air clean module 100 may include a filter assembly 10 described later, and may be cleaned after the filter assembly 10 is separated from a base body 110.

A user may supply water into the air wash module 200. The air wash module 200 may have a water supply flow passage 109 formed therein to supply water from the outside to the water tank 300.

The water supply flow passage 109 may be configured to be separated from a discharge flow passage 107 from which air is discharged. The water supply flow passage 109 may be configured to supply water into the water tank 300 at any moment. For example, even when the air wash module 200 is operating, water can be supplied through the water supply flow passage. For example, even when the air wash module 200 is coupled to the air clean module 100, water can be supplied through the water supply flow passage. For example, even when the air wash module 200 is decoupled from the air clean module 100, water can be supplied through the water supply flow passage.

The air clean module 100 and the air wash module 200 may be connected to each other through a connection flow passage 103. Since the air wash module 200 is separable, the connection flow passage 103 may be distributedly disposed at the air clean module 100 and the air wash module 200. Only when the air wash module 200 is placed over the air clean module 100, the flow passage of the air wash module 200 and the flow passage of the air clean module 100 may communicate with each other through the connection flow passage 103.

The connection flow passage formed in the air clean module 100 may be defined as a clean connection flow passage 104, and the connection flow passage formed in the air wash module 200 may be defined as a humidification connection flow passage 105.

The flow of air passing through the air clean module 100 and the air wash module 200 will be described in more detail later.

Hereinafter, the air clean module 100 and the air wash module 200 will be described in more detail.

The air clean module 100 may include a base body 110, a filter assembly 10 that is disposed in the base body 110 and filters air, and an air blowing unit 20 that blows air.

The air wash module 200 may include a water tank 300, a watering unit 400, a humidification medium 50, a visual body 210, and a top cover assembly 230. The water tank 300 may store water for humidification, and may be detachably disposed over the air clean module 100. The watering unit 400 may be disposed in the water tank 300, and may spray water in the water tank 300. The humidification medium 50 may be wetted with water sprayed from the watering unit 400, and may provide moisture to flowing air. The visual body 210 may be coupled to the water tank 300, and may be formed of a transparent material. The top cover assembly 230 may be detachably disposed over the visual body 210, and may include a discharge flow passage 107 through which air is discharged and a water supply flow passage 109 through which water is supplied.

The air clean module 100 may include an intake flow passage 101, a filtering flow passage 102, an air blowing flow passage 108, and a clean connection flow passage 104 disposed therein. Air entered through the intake flow passage 101 may flow to the clean connection flow passage 104 via the filtering flow passage 102 and the air blowing flow passage 108.

The air wash module 200 may include a humidification connection flow passage 105, a humidification flow passage 106, a discharge flow passage 107, and a water supply flow passage 109 disposed therein.

When the air wash module 200 is placed over the air clean module 100, the clean connection flow passage 104 of the air clean module 100 and the humidification connection flow passage 105 of the air wash module 200 may be connected to each other.

Filtered air supplied through the humidification connection flow passage 105 of the air wash module 200 may be discharged into the indoor via the humidification flow passage 106 and the discharge flow passage 107. The water supply flow passage 109 may be manufactured into a structure in which air is not discharged and only water is supplied while communicating with the humidification flow passage 106.

First, each configuration of the air clean module 100 will be described.

The base body 110 may include an upper body 120 and a lower body 130. The upper body 120 may be disposed on the lower body 130, and the upper body 120 and the lower body 130 may be assembled.

Air may flow into the base body 110.

The intake flow passage 101, the filtering flow passage 102, and the air blowing flow passage 108 may be disposed in the lower body 130, and structures that define the intake flow passage 101, the filtering flow passage 102, and the air blowing flow passage may be disposed in the lower body 130.

A portion of the connection flow passage 103 may be disposed in the upper body 120, and structures for guiding filtered air to the air wash module 200 and structures for supporting the air wash module 200 may be disposed in the upper body 120.

The base body 110 may include the lower body 130 defining the exterior thereof and having an inlet hole 110 formed in the undersurface thereof, and the upper body 120 defining the exterior thereof and coupled to the upper side of the lower body 130.

The filter assembly 10 may be detachably assembled in the base body 110.

The filter assembly 10 may provide the filtering flow passage 102, and may filter external air. The filter assembly 10 may have a structure that is detachable from the base body 110 in a horizontal direction. The filter assembly 10 may be disposed so as to cross the flowing direction of air that flows upstream in a vertical direction. The filter assembly 10 may slide in a horizontal direction, and may filter air that flows upward in a vertical direction. The filter assembly 10 may be disposed in a horizontal direction, and may form the filtering flow passage 102 in a vertical direction.

The filter assembly 10 may slide in a horizontal direction with respect to the base body 110.

The filter assembly 10 may include a filter housing 11 disposed in the lower body 130 and forming the filtering flow passage 102, and a filter 14 separably coupled to the filter housing 11 and filtering air passing the filtering flow passage 102.

The filter housing 12 may communicate with the intake flow passage 101 at the lower side thereof, and may communicate with the air blowing flow passage 108 at the upper side thereof. Air entered through the intake flow passage 101 may flow to the air blowing flow passage 108 via the filtering flow passage 102.

The filter housing 12 may be opened at one side thereof in a direction crossing the filtering flow passage 102. The filter 14 may detachably coupled through the opened surface of the filter housing 12. The opened surface of the filter housing 12 may be formed in a lateral direction. The opened surface of the filter housing 12 may be disposed on the outer surface of the lower body 130. Accordingly, the filter 14 may be inserted through the side surface of the lower body 130, and may be located inside the filter housing 12. The filter 14 may be disposed to cross the filtering flow passage 102, and may filter air passing the filtering flow passage 102.

The filter 14 may be an electric duct collecting filter that collects foreign substances in the air by electrifying the filter using applied power. The filter 14 may be formed of a material that collects foreign substances in the air through a filter medium. The filter 14 may be disposed in various structures. The scope of the inventive invention is not limited to the filtering method or the filter medium of the filter 14.

The filtering flow passage 102 may be disposed in the same direction as the main flowing direction of the humidification and air cleaning apparatus. In this embodiment, the filtering flow passage 102 may be disposed in a vertical direction, and may allow air to flow in the opposite direction to gravity. That is, the main flowing direction of the humidification and air cleaning apparatus may be formed so as to direct from bottom to top.

The air blowing unit 20 may be disposed over the filter housing 12.

The upper side surface of the filter housing 12 may be opened, and air passing the filtering flow passage 102 may flow to the air blowing unit 20.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side. The motor shaft of the blower motor 22 may direct to bottom, and may be coupled to the blower fan 24.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the upper body 120.

The blower housing 150 may form the air blowing flow passage 108 therein. The blower fan 24 may be disposed in the air blowing flow passage 108. The air blowing flow passage 108 may connect the filtering flow passage 102 and the clean connection flow passage 104.

The blower fan 24 may be a centrifugal fan, and may admit air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may be installed so as to be covered by the blower fan 24. The blower motor 22 may not be located on the airflow passage by the blower fan 24, and may not generate a resistance against air flowing by the blower fan 24.

The upper body 120 may include an upper outer body 128 forming the exterior of the base body and coupled to the lower body 130, an upper inner body 140 disposed inside the upper outer body 128, having the water tank 300 inserted therein, and providing the connection flow passage 103, and an air guide 170 coupling the upper inner body 140 and the upper outer body 128 and guiding air to the water tank 300.

Since the upper body 120 is disposed to separate the connection flow passage and the water tank insertion space, water of the water tank 300 flowing into the connection flow passage can be minimized Particularly, since the connection flow passage is divided by the upper inner body 140 and disposed outside a space in which water is stored, water can be inhibited from flowing into the connection flow passage.

The upper inner body 140 may be formed to be opened at the upper side thereof, and may receive the water tank 300.

The upper inner body 140 may form a portion of the clean connection flow passage 104 into which filtered air flows.

The upper inner body 140 may have an upper inlet 121 formed therein and corresponding to an air wash inlet 31. The upper inlet 121 may not be an essential component. It may be sufficient if the upper body 120 has a shape that exposes the air wash inlet 31 to the connection flow passage 103.

The air guide 170 may guide air supplied through the clean connection flow passage 104 to the upper inlet 121. The air guide 170 may collect air rising along the outside of the base body 110 toward the inside. The air guide 170 may change the flowing direction of air flowing from the lower side to the upper side. However, the air guide 170 may minimize the flow resistance of air by minimizing the change angle of the flow direction of air.

The air guide 170 may cover the outside of a circumference of the upper inner body 140. The air guide 170 may guide air to the water tank 300 in all directions of 360 degrees of circumference of the water tank 300. The air guide 170 may inwardly collect air guided along the outside of the lower body 130, and may supply the collected air to the water tank 300. Through this structure, the flow rate of air supplied to the water tank 300 can be sufficiently secured.

Accordingly, the air guide 170 may include a guide part 172 formed in the flowing direction of air, and a change part 174 that is connected to the guide part 172 and changes the flow direction of guided air.

The air guide 170 may form the connection flow passage 103.

The guide part 172 may be formed in the substantially same direction as the filtering flow passage 102, and in this embodiment, may be formed in a vertical direction. The change part 174 may be formed in a direction crossing the filtering flow passage 102, and in this embodiment, may be formed in a substantially horizontal direction.

The change part 174 may be disposed at an upper side of the air guide 170. The change part 174 may be connected to the guide part 172 through a curved surface.

Although the change part 174 is formed in a horizontal direction, air passing the connection flow passage 103 may upwardly flow in a substantially oblique direction. The flow resistance of air can be reduced by allowing a connection angle of the connection flow passage 103 and the filtering flow passage 102 to be similar to the straightly traveling direction.

The lower end of the guide part 172 may be fixed to the upper outer body 128. The upper end of the change part 174 may be fixed to the upper inner body 140.

A portion of the clean connection flow passage 104 may be formed outside the upper inner body 140. The air guide 170 may form a portion of the clean connection flow passage 104. Air passing the clean connection flow passage 104 may flow into the water tank 300 through the upper inlet 121 and the air wash inlet 31.

The upper inner body 140 may have a basket shape on the whole. The upper inner body 140 may have a circular shape in horizontal section, and the clean connection flow passage 104 may be formed in all directions of 360 degrees of a circumference of the upper inner body 140.

The air guide 170 may be a component for guiding filtered air to the clean connection flow passage 104, and may be omitted in accordance with embodiments. The air guide 170 may combine the upper inner body 140 or the upper outer body 128.

The air guide 170 may be formed to cover the upper inner body 140. Particularly, the air guide 170 may be formed to cover the upper inlet 121, and may guide filtered air to the upper inlet 121. When viewed from top, the air guide 170 may have a donut shape.

In this embodiment, the upper end of the air guide 170 may adhere closely to the upper end of the upper inner body 140.

When viewed from top, the upper side surface of the air guide 170 may coincide with the upper side surface of the upper inner body 140. In this embodiment, an upper inner body ring 126 may be disposed on the upper end of the upper inner body 140 to be coupled to or adhere closely to the air guide 170.

An inner body extension part 148 may be disposed to connect the upper inner body 140 and the upper inner body ring 126. The inner body extension part 148 may be disposed in plurality. An upper inlet 121 may be formed between the inner body extension part 148 and the upper inner body ring 126.

The inner body extension part 148 may correspond to a water tank body extension part 380. When the water tank 300 is placed, the water tank body extension part 380 may be located inside the inner body extension part 148. The inner body extension part 148 and the water tank body extension part 380 may overlap each other inside and outside.

The upper end of the air guide 170 may adhere closely to or be coupled to the upper inner body ring 126. The lower end of the air guide 170 may adhere closely to or be coupled to the upper outer body 128.

Accordingly, air flowing through the clean connection flow passage 104 between the upper inner body 140 and the upper outer body 128 may be guided to the upper inlet 121.

The diameter of the upper inner body ring 126 and the diameter of the upper end of the air guide 170 may be the same as or similar to each other. The air guide 170 and the upper inner body ring may adhere closely to each other to prevent leakage of filtered air. The upper inner body ring 126 may be disposed inside the air guide 170.

A grip 129 may be formed on the upper outer body 128. The air wash module 200 may be placed in the upper body, and the whole of the humidification and air cleaning apparatus can be lifted through the grip 129.

The upper inner body 140 may have the water tank insertion space 125 formed therein so as to receive the water tank 300.

The clean connection flow passage 104 may be disposed outside the upper inlet 121, and the water tank insertion space 125 may be disposed inside the upper inlet 121. Air flowing along the clean connection flow passage 104 may pass through the upper inlet 121. When the water tank 300 is placed in the water tank insertion space 125, filtered air passing through the upper inlet 121 may flow into the water tank 300.

Meanwhile, an outer visual body 214 may be coupled to the upper side of the upper body 120.

The outer visual body 214 may be a component of the visual body 210, but in this embodiment, may be fixed to the upper body 120. Unlike this embodiment, the outer visual body 214 may also be fixed to the air wash module 200. Unlike this embodiment, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material through which a user can see the inside of the outer visual body 214. The outer visual body 214 may be formed of a transparent or translucent material.

A display module 160 may be disposed in at least one of the air clean module 100 or the air wash module 200 to display the operational state to a user. In this embodiment, the display module 160 may be disposed in the base body 110 to display the operational state of the humidification and air cleaning apparatus to a user.

The display module 160 may be disposed inside the outer visual body 214. The display module 160 may be disposed to adhere closely to the inner side surface of the outer visual body 214. When viewed from top, the display module 160 may have a donut shape. The water tank 300 may be inserted into the display module 160.

The display module 160 may be supported by the outer visual body 214. The inner edge of the display module 160 may be supported by the upper inner body ring 126. The display module 160 may be disposed over the air guide 170. The display module 160 may be manufactured integrally with a connector 260.

The display module 160 may be disposed over the air guide 170. The display module 160 may be disposed between the upper outer body 128 and the upper inner body 140. The display module 160 may cover the upper outer body 128 and the upper inner body 140 such that a user cannot see a gap between the upper outer body 128 and the upper inner body 140. The inside and the outside of the display module 160 may be sealed to prevent water from permeating between the upper outer body 128 and the upper inner body 140.

The inside of the display module 160 may be supported by the upper inner body 140, and the outside of the display module 160 may be supported by the outer visual body 218.

In this embodiment, the display 160 may have a ring shape. Unlike this embodiment, the display 160 may be formed into an arc shape. The surface of the display 160 may be formed of a material that can reflect light, or may be coated with a material that can reflect light.

Accordingly, when water drops are formed on the visual body 210, water drops formed on the visual body 210 may be projected onto or reflected by the surface of the display 160. When the water drops formed on visual body 210 flows down, the same effect is also shown on the display 160.

This effect may give a visual stimulus to a user, and a user may intuitively recognize that humidification is being performed. The water drop image projected on the display 160 may give a refreshment feeling to a user, and may allow a user to know the humidification state.

The upper side surface of the display 160 may be obliquely formed. The display 160 may be obliquely disposed toward a user. Accordingly, the inside of the display 160 may be high, and the outside thereof may be low.

Hereinafter, each configuration of the air wash module 200 will be described.

The air wash module 200 may increase humidity in the filtered air. The air wash module 200 may implement a rain view in the humidification flow passage 106. The air wash module 200 may spray and circulate water in the water tank 300. The air wash module 200 may change water into small-sized droplets, and may again wash filtered air through scattered droplets. When filtered air is washed through scattered droplets, humidification and filtering may be performed once again.

The air wash module 200 may include the humidification connection flow passage 105, the humidification flow passage 106, the discharge flow passage 107, and the water supply flow passage 109.

The air wash module 200 may include the water tank 300, the watering unit 400, the humidification medium 50, the visual body 210, the top cover assembly 230, and a handle 180.

The handle 180 may be coupled to the visual body 210, may rotate in the visual body 210, and may be held in the visual body 210. A user may simply lift up only the air wash module 200 through, and may separate the air wash module 200 from the air clean module 100.

The humidification connection flow passage 105 may be disposed outside the water tank 300, and may guide air into the water tank 300. The humidification connection flow passage 105 may be disposed outside the visual body 210, and may guide air into the visual body 210.

The humidification connection flow passage 105 may be disposed at the outside of at least one of the water tank 300 and the visual body 210, and may guide air into one of the water tank 300 and the visual body 210.

The discharge flow passage 107 may be disposed between the top cover assembly 230 and the visual body 210. The discharge flow passage 107 may be disposed in at least one of the top cover assembly 230 and the visual body 210.

In this embodiment, the discharge flow passage 107 may be disposed at the outer edge of the top cover assembly 230, and the water supply flow passage 109 may be disposed at the center of the inside of the top cover assembly 230.

In the humidification and air cleaning apparatus according to this embodiment, a power source may be connected to the air clean module 100, and the air wash module 200 may be supplied with power through the air clean module 100.

Since the air wash module 200 has a structure separable from the air clean module 100, the air clean module 100 and the air wash module 200 may be provided with a separable power supply structure.

Since the air clean module 100 and the air wash module 200 are separably assembled through the upper body 120, a connector 260 may be disposed in the upper body 120 to provide power for the air wash module 200.

The top cover assembly 230 of the air wash module 200 may be provided with a control part and a display which requires power. A top connector 270 may be disposed in the air wash module 200, and may be separably connected to the connector 260. The top connector 270 may be disposed in the top cover assembly 230.

In this embodiment, since the top cover assembly 230 is separable, the inner side surface of the visual body 210 or the inner side surface of the water tank 300 can be conveniently cleaned.

The top cover assembly 230 may include the water supply flow passage 109 formed therein, and may form the discharge flow passage 107 with the visual body 210 in between. The top cover assembly 230 may be installed separately from the visual body 210. The top cover assembly 230 may include the top connector 270 disposed therein and electrically connected to the connector 260.

When the top cover assembly 230 is placed, the top connector 270 may be disposed over the connector 260. The top cover assembly 230 may be supplied with electricity from the connector 260 via the top connector 270.

A water level display part (not shown) may be disposed around the water supply flow passage 109 to display the water level of the water tank 300. Thus, a user can check the water level of the water tank 300 when supplying water. By disposing the water level display part on the movement line of water supply, a user can be prevented from excessively supplying water, and the water tank 300 can be prevented from overflowing.

The water level display part may be disposed in the top cover assembly 230. The separable power supply structure of the top connector 270 and the connector 260 may achieve effective upper water supply.

The water tank 300 may be separably placed in the upper body 120. The watering unit 400 may be disposed inside the water tank 300, and may rotate inside the water tank 300.

The water tank 300 may include a water tank body 320 storing water, an air wash inlet 31 formed at the side surface of the water tank body 320, and a water tank body extension part 380 upwardly extending from the water tank body 320 and coupled to the visual body 210.

In this embodiment, the water tank body 320 may be formed into a cylindrical shape with an opened upper side. Unlike this embodiment, the water tank body 320 may be formed into various shapes.

The water tank body extension part 380 may upwardly extend from the water tank 300. The water tank body extension part 380 may form the air wash inlet 31. The air wash inlet 31 may be formed between the water tank body extension part 380.

The air wash inlet 31 may be formed in the side surface of the water tank body 320. The air wash inlet 31 may be formed on the water tank body 320 in all directions of 360 degrees of a circumference of the water tank body 320. The air wash inlet 31 may communicate with the humidification connection flow passage 105.

The water tank body extension part 380 may guide water flowing down from the inner side surface of the visual body 210 into the water tank 300. The noise of dropping water can be minimized by guiding water flowing down from the visual body 210.

The water tank body extension part 380 may be coupled to the lower end of the visual body 210.

In this embodiment, the air wash inlet 31 may be formed by the configuration of the water tank body 320. Unlike this embodiment, the air wash inlet 31 may also be formed by disposing the water tank body extension part 380 in the visual body 210. Also unlike this embodiment, a portion of a plurality of water tank body extension parts 380 may be disposed in the water tank 300, and other water tank body extension parts 380 may be disposed in the visual body 210 to configure the air wash inlet 31. Unlike this embodiment, the air wash inlet 31 may also be formed in a separate configuration distinguished from the visual body 210 and the water tank 300. Unlike this embodiment, the air wash inlet 31 may also be formed by forming an opened surface in the visual body 210 and by forming an opened surface in the water tank 300.

That is, the air wash inlet 31 may be disposed in at least one of the water tank 300 and the visual body 210. The air wash inlet 31 may be formed by combining the water tank 300 and the visual body 210. The air wash inlet 31 may be disposed in a separate configuration distinguished from the water tank 300 and the visual body 210, and then the separate configuration may be disposed between the water tank 300 and the visual body 210. The air wash inlet 31 may be formed by combination of the water tank 300 and the visual body 210.

The air wash inlet 31 may be disposed at the side of the air wash module 200, and may be connected to the humidification flow passage 106. The air wash inlet 31 may communicate or connect with the humidification connection flow passage 105.

The watering unit 400 may have a function of supplying water to the humidification medium 50. The watering unit 400 may have a function of visualizing the humidification process. The watering unit 400 may have a function of implementing a rain view inside the air wash module 200.

The watering unit 400 may draw water inside the water tank 300 by rotating a watering housing 800, may upwardly pump drawn water, and then may spray pumped water toward the outside in a radial direction. The watering unit 400 may include the watering housing 800 that draws water, upwardly pumps drawn water, and then sprays pumped water toward the outside in a radiation direction.

In this embodiment, the watering housing 800 may be rotated in order to spray water. Unlike this embodiment, water may also be sprayed using a nozzle instead of the watering housing. Water may be supplied to the humidification medium 50 by spraying water from the nozzle, and the rain view may be similarly implemented. According to embodiments, water may be sprayed from the nozzle, and the nozzle may be rotated.

Water sprayed from the watering housing 800 may wet the humidification medium 50. Water sprayed from the watering housing 800 may be sprayed toward at least one of the visual body 210 and the humidification medium 50.

Water sprayed toward the visual body 210 may implement a rain view. Water sprayed toward the humidification medium 50 may be used to humidify filtered air. The rain view may be implemented by spraying water toward the visual body 210, and then water flowing down from the visual body 210 may be used to wet the humidification medium 50.

In this embodiment, a plurality of nozzles having different heights may be disposed on the watering housing 800. Water discharged out of any one nozzle may form droplets on the inner side surface of the visual body 210 to implement a rain view, and water discharged out of another nozzle may wet the humidification medium 50 to be used for humidification.

The watering housing 800 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

Particularly, water flowing down from the visual body 210 may wet the humidification medium 50 to be used for humidification. The humidification medium 50 may be wetted with water sprayed from the watering housing 800 and water flowing down from the visual body 210.

The visual body 210 may be coupled to the water tank 300, and may be located over the water tank 300. At least a portion of visual body 210 may be formed of a material through which a user can see the inside.

A display module 160 may be disposed outside the visual body 210. The display module 160 may be coupled to any one of the visual body 210 and the upper body 120.

The display module 160 may be disposed on a location where a user can observe a rain view. In this embodiment, the display module 160 may be disposed at the upper body 120.

When the air wash module 200 is placed, the outer surface of the visual body 210 may adhere closely to the display module 160. At least a portion of the surface of the display module 160 may be formed of or coated with a material that reflects light.

Droplets formed on the visual body 210 may also be projected onto the surface of the display module 160. Accordingly, a user can observe the motion of droplets at both visual body 210 and display module 160.

The water tank 300 may include the air wash inlet 31 which is formed thereon and through which air passes. The air wash inlet 31 may be located between the connection flow passage 103 and the humidification flow passage 106. The air wash inlet 31 may be an outlet of the connection flow passage 103, and may be an inlet of the humidification flow passage 106.

Filtered air supplied from the air clean module 100 may flow into the air wash module 200 through the air wash inlet 31.

The humidification medium 50 may include a water tank humidification medium 51 disposed at the inlet of the humidification flow passage 106, and a discharge humidification medium 55 disposed at the outlet of the humidification flow passage 106. The outlet of the humidification flow passage 106 and the inlet of the discharge flow passage 107 may be connected to each other. Accordingly, the discharge humidification medium 55 may be disposed at the discharge flow passage 107.

Since the connection flow passage 103, the humidification flow passage 106, and the discharge flow passage 107 are not formed of structures such as duct, it may be difficult to clearly distinguish the boundaries thereof. However, the humidification flow passage 106 in which humidification is performed is defined as between the water tank humidification medium 51 and the discharge humidification medium 55, the connection flow passage 103 and the discharge flow passage 107 may be naturally defined.

The connection flow passage 103 may be defined as between the blower housing 150 and the water tank humidification medium 51. The discharge flow passage 107 may be defined as after the discharge humidification medium 55.

In this embodiment, the water tank humidification medium 51 may be disposed at the air wash inlet 31 of the water tank 300.

The water tank humidification medium 51 may be located at least one of the same plane, the outside, and the inside of the air wash inlet 31. Since the water tank humidification medium 51 is wetted with water for humidification, it may be desirable that the water tank humidification medium 51 is located at the inside of the air wash inlet 31.

Water flowing down after wetting the water tank humidification medium 51 may be stored in the water tank 300. Water flowing down after wetting the water tank humidification medium 51 may be configured so as not to flow out of the water tank 300.

Thus, the water tank humidification medium 51 may humidify filtered air passing through the air wash inlet 31.

Water that is naturally evaporated from humidification medium 50 may humidify filtered air. The natural evaporation means that water evaporates in a state where separated heat is not applied to water. As contact with air increases, as the flow velocity of air increases, as the pressure in the air decreases, the natural evaporation may be promoted. The natural evaporation may also be referred to as natural vaporization.

The humidification medium 50 may promote the natural evaporation of water. In this embodiment, the humidification medium 50 may be wetted with water, but may not be immersed in the water tank 300.

Since disposed separately from water stored in the water tank 300, the water tank humidification medium 51 and the discharge humidification medium 55 may not be always wet even though there is water stored in the water tank 300. That is, the water tank humidification medium 51 and the discharge humidification medium 55 may become wet only during the operation of humidification mode, and the water tank humidification medium 51 and the discharge humidification medium 55 may be maintained at a dry state during the operation of air cleaning mode.

The water tank humidification medium 51 may cover the air wash inlet 31, and air may penetrate the water tank humidification medium 51 to flow into the water tank 300.

The discharge humidification medium 55 may be disposed at the outlet of the humidification flow passage 106 or at the inlet of the discharge flow passage 107.

In this embodiment, the discharge humidification medium 55 may be disposed so as to cover the upper part of the visual body 210. The discharge humidification medium 55 may be placed on the visual body 210. Unlike this embodiment, the discharge humidification medium 55 may be coupled to the undersurface of the top cover assembly 230.

The discharge humidification medium 55 may cover the discharge flow passage 107, and humidified air may penetrate the discharge humidification medium 55 and then flow to the discharge flow passage 107.

Hereinafter, the flow of air will be described with reference to the accompanying drawings.

When the air blowing unit 20 operates, external air may flow into the base body 110 through the intake flow passage 101 formed at a lower side of the base body 110. Air entered through the intake flow passage 101 may sequentially pass the air clean module 100 and the air wash module 200 while moving upward, and may be discharged to the outside through the discharge flow passage 107 formed at an upper side of the air wash module 200.

Air entered to the intake flow passage 101 may pass the filtering flow passage 102 of the filter assembly 10, and the filter assembly 10 may filter external air.

Air passing the filtering flow passage 102 may flow to the connection flow passage through the air blowing unit 20. Air passing the filtering flow passage 102 may flow into the air blowing flow passage 108.

The filtered air may be pressurized by the blower fan 24 in the air blowing flow passage 108, and then may flow to the clean connection flow passage 104.

Since the air blowing unit 20 is disposed next to the filtering flow passage 102, the air blowing unit 20 may pressurize and blow filtered air. Through the arrangement relation of the filter assembly 10 and the air blowing unit, adherence of foreign substances like dust on the blower fan 24 can be minimized.

When the air blowing unit 20 is disposed at the front of the filtering flow passage 102, external air may first contact the blower fan 24, and thus the possibility that foreign substances adhere to the blower fan 24 may increase. When the blower fan 24 is contaminated with foreign substances, a user needs to periodically clean the blower fan 24, and a structure for cleaning the blower fan 24 may be needed.

Since the air blowing unit 20 according to this embodiment blows filtered air from which foreign substances are removed, a separate cleaning may not be needed.

Also, since the air blowing unit 20 is disposed at the front of the humidification flow passage 106, adherence of moisture on the surface of the blower fan 24 can be minimized. When moisture adheres to the surface of the blower fan 24, foreign substances may adhere to the surface of the blower fan 24 or molds grow on the blower fan 24.

Since the air blowing unit 20 is disposed at the rear of the filtering flow passage 102 and at the front of the humidification flow passage 106, the contamination of the air blowing unit 20 can be minimized.

The connection flow passage 103 may include the clean connection flow passage 104 formed in the air clean module 100 and the humidification connection flow passage 105 formed in the air wash module 200.

When the air wash module 200 is placed on the upper body 120, the clean connection flow passage 104 and the humidification connection flow passage 105 may be connected to each other. When the air wash module 200 is in a separated state, the clean connection flow passage 104 and the humidification connection flow passage 105 may be exposed to the outside.

The clean connection flow passage 104 may be formed in the upper body 120, and the humidification connection flow passage 105 may be formed in the air wash module 200.

The clean connection flow passage 104 and the humidification connection flow passage 105 may also be formed in a form of duct to form a clear flow passage. In this embodiment, the connection flow passage 103 may distributedly disposed in the structure of the upper body 120 and the structure of the water tank 300.

The connection flow passage 103 may also be formed using a configuration such as duct. However, when air is supplied into the water tank 300 through a structure such as duct, the flow resistance may significantly increase due to the duct, and it may be difficult to secure a sufficient flow rate. When the flow rate supplied into the water tank 300 is limited, RPM of the blower fan 24 needs to increase, and thus power consumption and noise may increase.

In this embodiment, the connection flow passage 103 may provide air to the water tank 300 in all directions of 350 degrees, thereby securing a sufficient flow rate.

Filtered air passing the air blowing flow passage 108 may flow into the clean connection flow passage 104 formed in the upper body 120. The air guide 170 may be disposed in the clean connection flow passage 104 of the upper body 120 to minimize the change of the flow direction of filtered air. The air guide 170 may minimize the connection angle of filtered air that flows.

In this embodiment, since the upper inner body 140 forming the water tank insertion space 125 is disposed in the upper body 120, the clean connection flow passage 104 may be directly connected to the air wash inlet 31.

Unlike this embodiment, when the height of the upper inner body 140 is small or zero, the outer wall of the water tank 300 may provide the humidification connection flow passage 105. In other words, when there is only the bottom 141 of the upper inner body 140 and no side wall of the upper inner body 140, the outside of the side wall of the water tank 300 may provide the humidification connection flow passage 105, and the inner side of the air guide 170 may provide the clean connection flow passage 104. Also, when the water tank 300 is placed on the bottom 141, the connection flow passage 103 may be connected.

In this embodiment, filtered air of the clean connection flow passage 104 may sequentially pass the upper inlet 121 and the air wash inlet 31, and then may pass the water tank humidification medium 51 to flow into the humidification flow passage 106.

The humidification flow passage 106 may be a section in which moisture is supplied to filtered air. In this embodiment, the humidification flow passage 106 may be a flow passage or a space from the water tank humidification medium 51 to the discharge humidification medium 55.

In the humidification flow passage 106, humidification may be performed through various paths.

First, in a process where filtered air passes the water tank humidification medium 51, moisture of the water tank humidification medium 51 may be naturally evaporated, and filtered air may be supplied with moisture.

Second, filtered air may be supplied with moisture by water drops scattered from the watering unit 400.

Third, humidification may be performed by moisture that is evaporated in the water tank 300.

Fourth, also in a process where filtered air passes the discharge humidification medium 55, water wetting the discharge humidification medium 55 may be naturally evaporated, and thus filtered air may be supplied with moisture.

Thus, when passing the humidification flow passage 106, filtered air may be supplied with moisture through various paths.

Air passing the discharge humidification medium 55 may be exposed to the outside through the discharge flow passage 107.

Air that is filtered and humidified may be discharged through the discharge flow passage 107. The discharge flow passage 107 may discharge air in all directions of 360 degrees with respect to the upper side and inclined direction.

Figure 6:
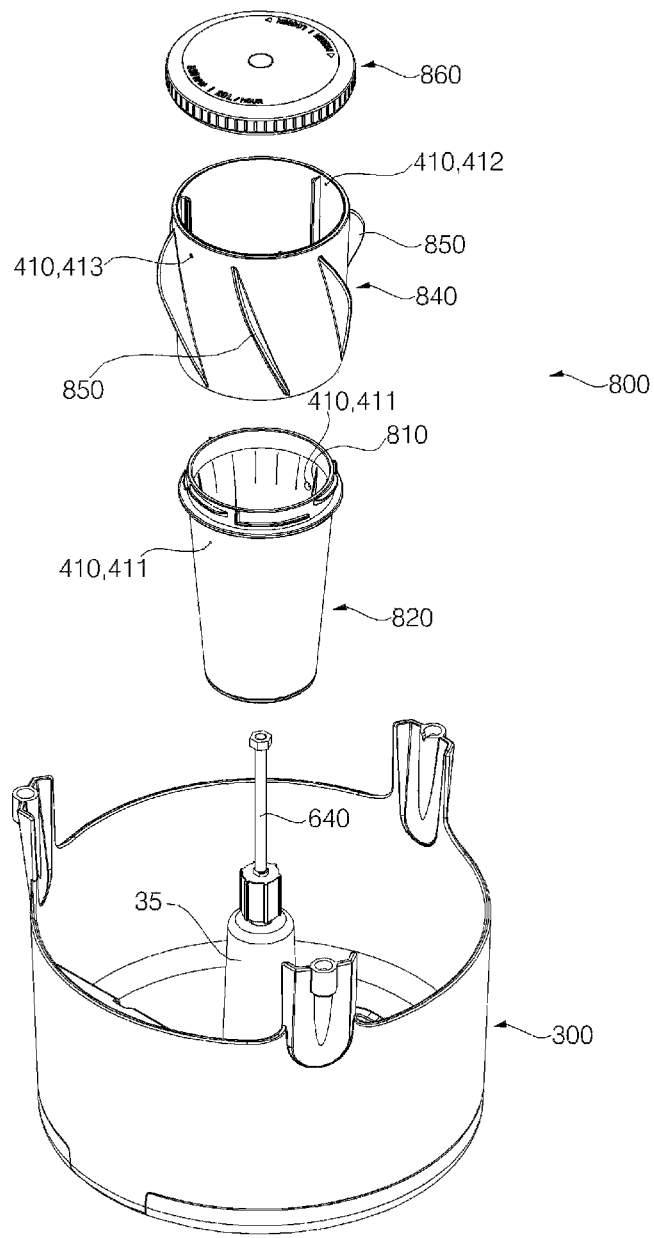
FIG. 6 is an exploded perspective view illustrating a watering unit according to a first embodiment of the present invention.
Figure 7:
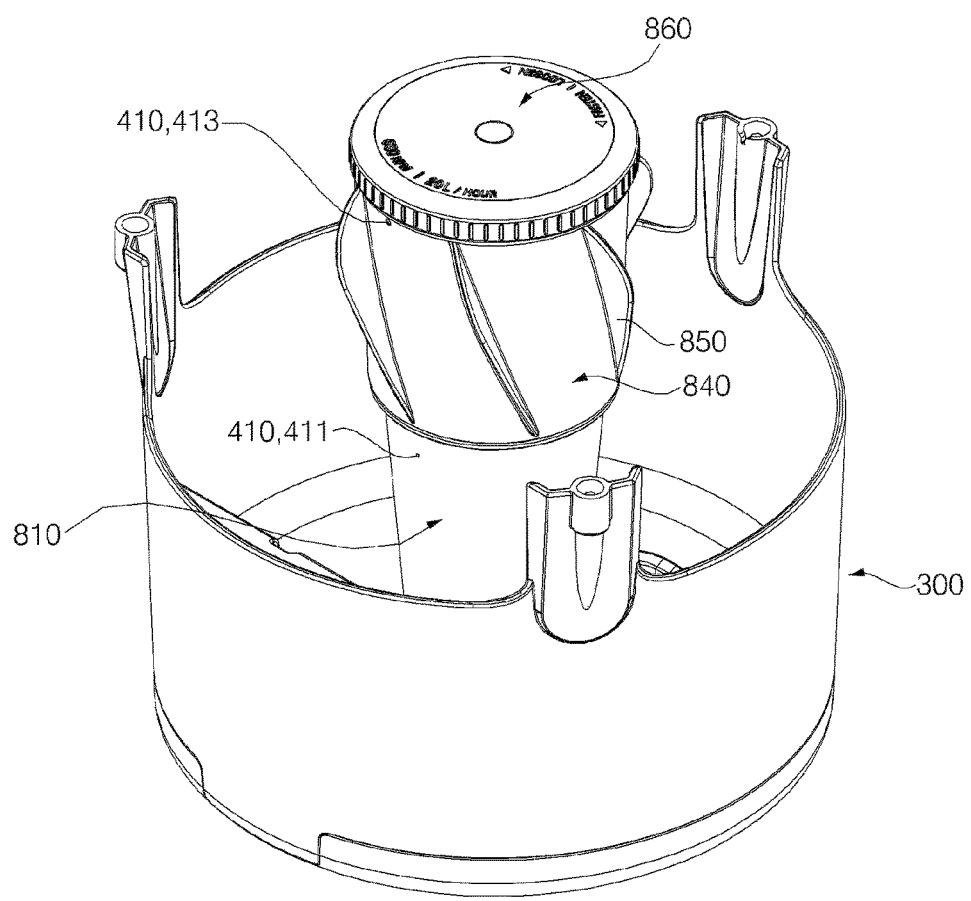
FIG. 7 is an assembly perspective view illustrating the watering unit shown in FIG. 6.
Figure 8:
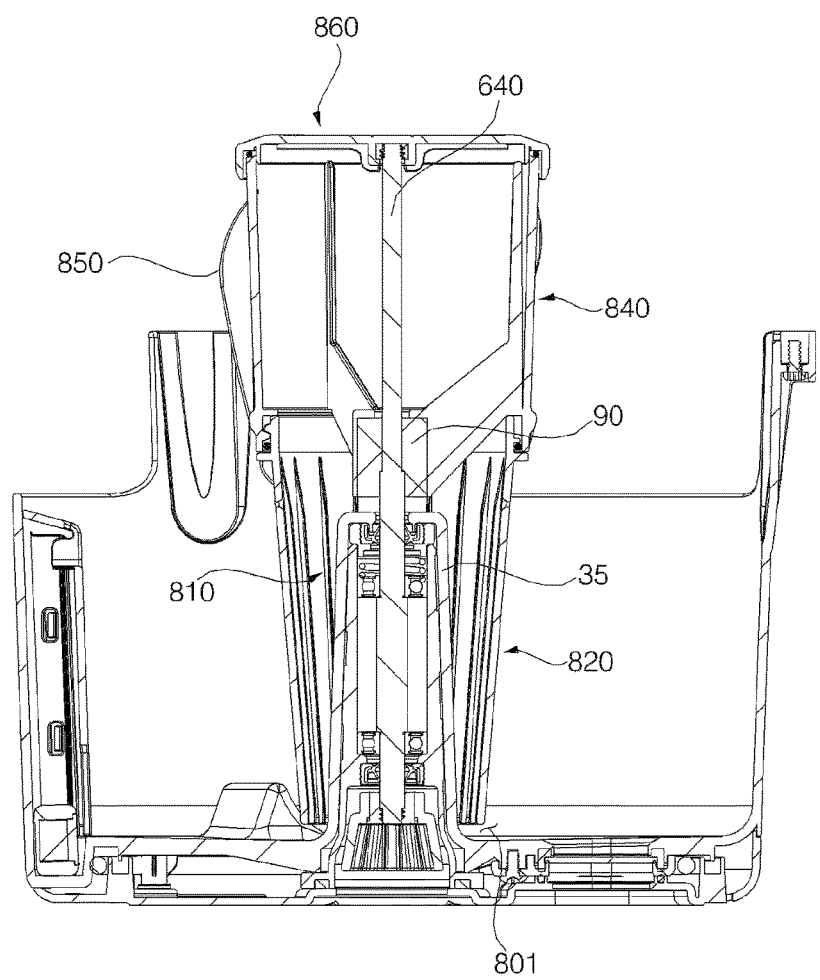
FIG. 8 is a cross-sectional view of FIG. 7.

FIG. 6 is an exploded perspective view illustrating a watering unit according to a first embodiment of the present invention. FIG. 7 is an assembly perspective view illustrating the watering unit shown in FIG. 6. FIG. 8 is a cross-sectional view of FIG. 7.

The watering housing 800 may be a configuration for spraying water stored in the water tank 300. The watering housing 800 may be a component for spraying water stored in the water tank 300.

The watering housing 800 may rotate by a torque of a watering motor 42, and upon rotation, may draw water stored in the water tank 300 and then pump water upward. Water pumped into the watering housing 800 may be discharged through a nozzle 410.

A pumping unit may be disposed in the watering housing 800. The pumping unit may upwardly pump water in water tank 300. The pumping of water in the water tank 300 may be implemented in various methods.

For example, water may be pumped by the pump, and then may be sprayed.

For example, the watering housing 800 may rotate, and upon rotation, may pump water through friction or mutual interference with water.

In this embodiment, a structure in which water is pumped through rotation of the watering housing may be proposed. In this embodiment, the pumping unit may be a pump groove 810 which upwardly push water through friction or mutual interference with water.

The pump groove 810 that is a pumping unit may be disposed on the inner side surface of the watering housing 800. The pump groove 810 may improve the pumping efficiency. The pump groove 810 may protrude from the inner side surface of the watering housing 800. The pump groove 810 may longitudinally extend in a vertical direction. The pump groove 810 may be radially disposed with respect to the watering motor shaft 43 or the power transmission shaft 640.

The lower end of the watering housing 800 may be spaced from the undersurface of the water tank 300 by a certain gap to form a suction gap 801. Water of the water tank 300 may be drawn into the watering housing 800 through the suction gap 801.

The watering housing 800 may be downwardly opened. The watering housing 800 may have a cup shape. The watering housing 800 may have an inverted cup shape. A housing space 805 may be formed inside the watering housing 800.

The column 35 of the water tank 300 may be located inside the watering housing 800, and a power transmission module 600 may be disposed inside the column 35. The watering housing 800 may be disposed to cover the column 35.

The watering housing 800 may be formed such that the horizontal section thereof gradually expands in an upward direction. The column 35 may be formed such that the horizontal section thereof is gradually reduced in an upward direction. The shapes of the watering housing 800 and the column 35 may be implemented in order to efficiently pump water. The capacity of housing space 805 may gradually increase in an upward direction.

When the watering housing 800 rotates, drawn water may adhere closely to the inner circumferential surface of the watering housing 800 by a centrifugal force. The pump groove 810 formed on the inner circumferential surface of the watering housing 800 may provide a torque to water drawn to the inside.

A nozzle 410 may be disposed in the watering housing 800 to discharge drawn water to the outside. In this embodiment, the nozzle 410 may be disposed so as to discharge water in a horizontal direction. Pumped water may be discharged through the nozzle 410.

In this embodiment, water discharged out of the nozzle 410 may be sprayed to the visual body 210.

The number of nozzles 410 may vary with the design conditions. In this embodiment, the nozzle 410 may be disposed in plurality while having different heights from each other in the watering housing 800. A nozzle that is disposed at an upper side of the watering housing 800 may be defined as a second nozzle, and a nozzle that is disposed at a middle side of the watering housing 800 may be defined as a first nozzle.

When the watering housing 800 rotates at the same speed as and faster than a first rotation speed, water may be sprayed from the first nozzle. When the watering housing 800 rotates at the same speed as and faster than a second rotation speed, water may be sprayed from the second nozzle.

The second rotation speed may be larger than the first rotation speed.

Only when the watering housing 800 rotates at a high speed, water may be discharged out of the second nozzle. The watering housing 800 may be disposed such that water is not discharged through the second nozzle at a usual rotation speed. The first nozzle may discharge water in all stages where watering housing ordinarily operates.

The second nozzle may be disposed in plurality. The first nozzle may be disposed in plurality.

When the watering housing 800 rotates at a usual rotation speed, pumped water may rise at least higher than the first nozzle. When the watering housing 800 rotates at a high speed, pumped water may rise to the same height as and higher than the second nozzle.

The second nozzle may be disposed in plurality in a circumferential direction of the watering housing 800. The first nozzle may also be disposed in plurality in a circumferential direction of the watering housing 800.

When the watering housing 800 does not rotate, water may not be discharged through the nozzle 410. When a user operates only clean mode (air clean module operates but air wash module stops), the watering unit 40 may not operate, and only the air blowing unit 20 may operate. When a user operates only humidification mode, the watering housing 800 may rotate, and water may be discharged out of the nozzle 410. When a user operates both air cleaning mode and humidification mode, water discharged out of the nozzle 410 may be sprayed to the inner side surface of the visual body 210.

Since the watering housing 800 rotates, water discharged from the nozzle 410 may hit the inner side surface of the visual body 210, and then may flow along the inner side surface of the visual body 210.

A user may visually check through the visual body 210 that water is sprayed. This spraying of water may mean that humidification mode is operating. Through the spraying of water, a user can intuitively check that humidification mode is operating.

Droplets may be formed on the visual body 210 by sprayed water, and the droplets may flow down.

In this embodiment, the watering housing 800 may have three parts. Unlike this embodiment, the watering housing 800 may be manufactured into one or two components.

The lower end of the watering housing 800 may be disposed to be spaced from the undersurface of the water tank 300 by a certain gap.

The watering housing 800 may include a first watering housing 820, a second watering housing 840, a watering housing cover 860, and a watering power transmission unit 880.

The watering housing 800 may be assembled with the power transmission shaft 640, and may include a structure disposed therein and receiving a torque from the power transmission shaft 640. In the watering housing 800, the watering power transmission unit 880 and the watering housing cover 860 may be assembled with the power transmission shaft 640. The watering housing 800 may be connected to the power transmission shaft 640 at two points, and may receive a torque from the two points.

The first nozzle 411 may be disposed in the first watering housing 820. In this embodiment, two first nozzles 411 may be disposed. The two first nozzles 411 may be disposed so as to direct the opposite direction to each other.

The first nozzle 411 may communicate the inner and outer sides of the first watering housing 820. In this embodiment, the aperture area of the inside of the first nozzle 411 may be larger than the aperture area of the outside of the first nozzle 411.

A watering blade 850 may be formed on the outer circumferential surface of the second watering housing 840. The watering blade 850 may allow humidified air to flow. When the watering housing 800 rotates, the watering blade 850 may attract ambient air.

The second watering housing 840 may include second nozzles 412 and 413 formed therein. The second nozzles 412 and 413 may spray water toward the visual body 210. In this embodiment, two second nozzles 412 and 413 may be disposed. One of the two second nozzles may be defined as a 2-1 nozzle 412, and the other may be defined as a 2-2 nozzle 413.

The 2-1 nozzle 412 and the 2-2 nozzle 413 may be disposed so as to face the opposite directions to each other. The 2-1 nozzle 412 and the 2-2 nozzle 413 may be symmetrically disposed based on the power transmission shaft 640.

The spray line formed by the 2-1 nozzle 412 may be defined as a first spray line, and the spray line formed by the 2-2 nozzle 413 may be defined as a second spray line.

Figure 9:
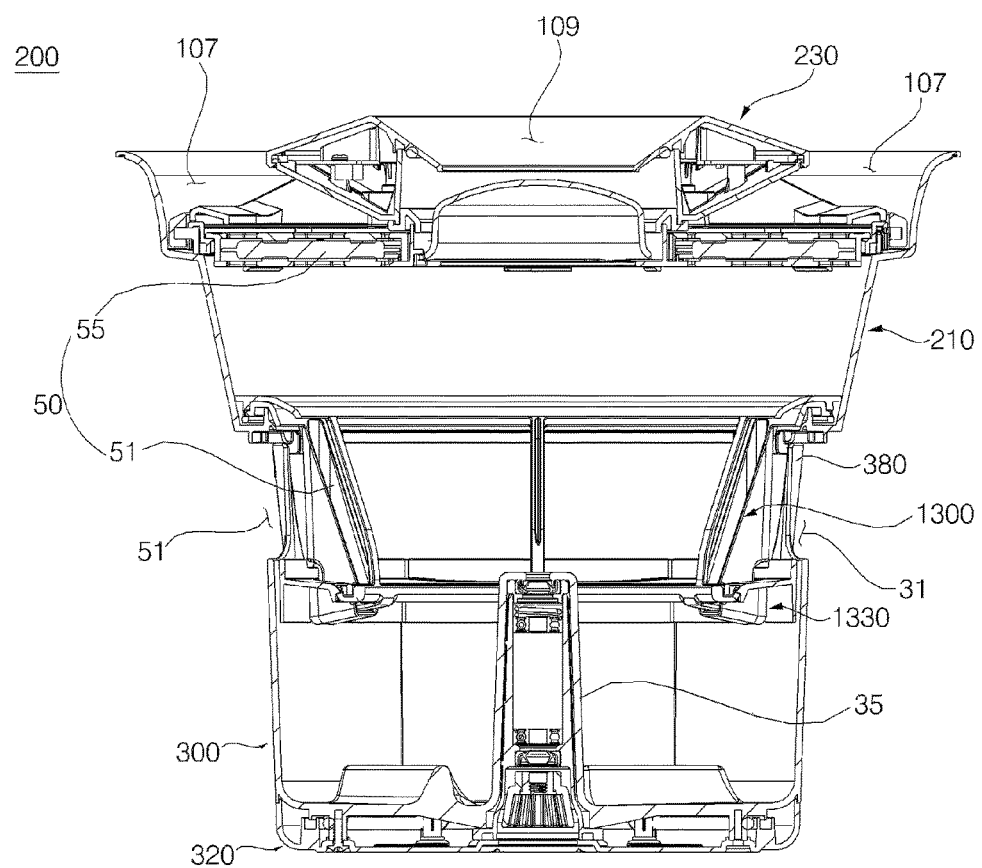
FIG. 9 is a cross-sectional view illustrating an air wash module from which a watering unit is removed in FIG. 4.
Figure 10:
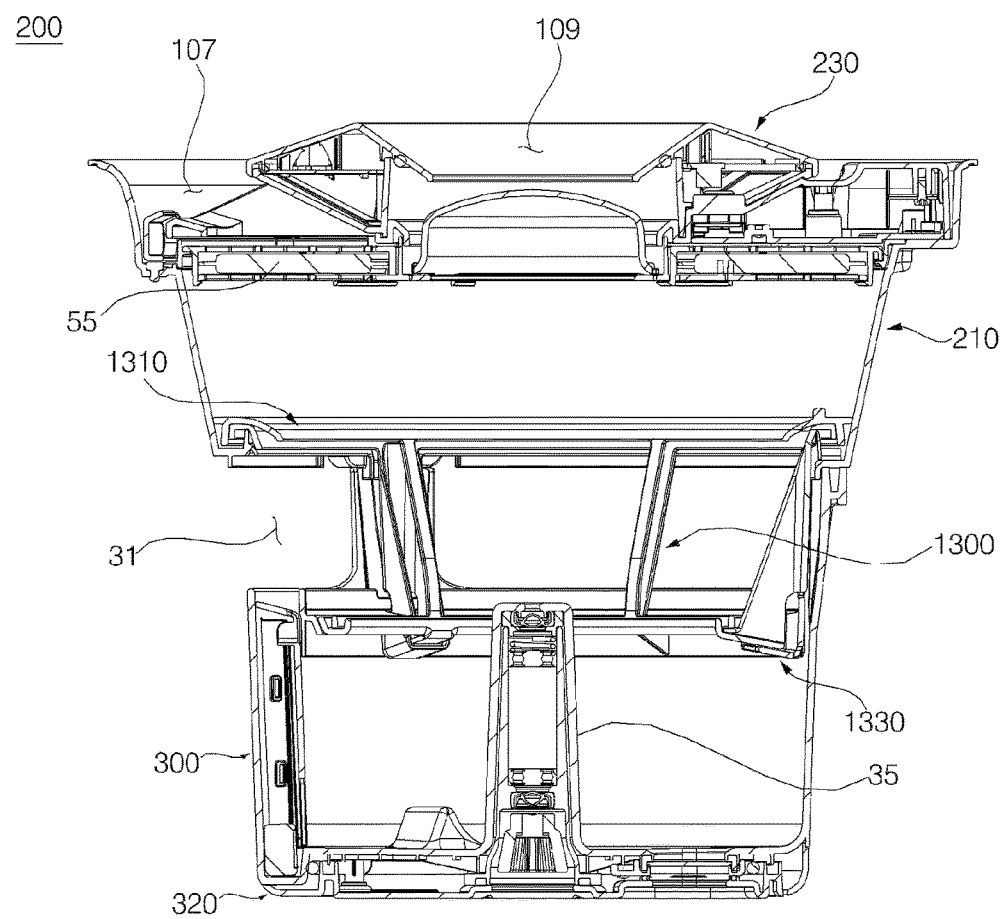
FIG. 10 is a cross-sectional view of FIG. 9 when viewed from another direction.
Figure 11:
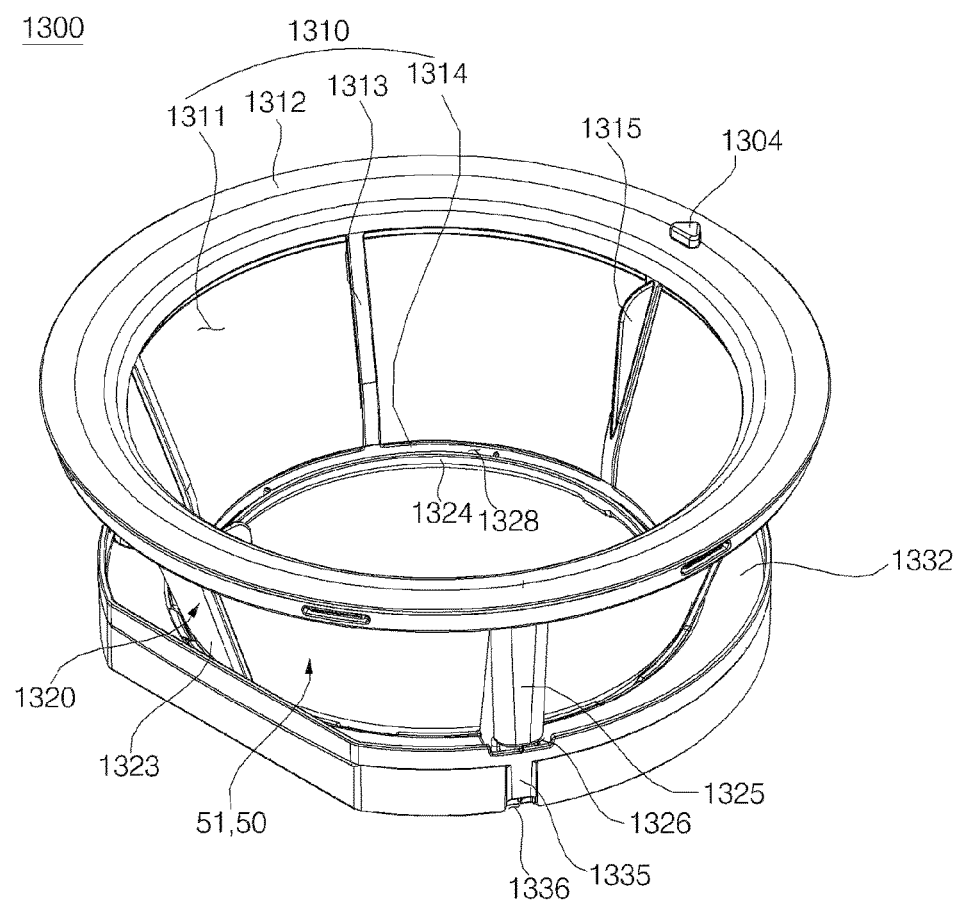
FIG. 11 is a perspective view illustrating a water tank humidification medium housing shown in FIG. 9.
Figure 12:
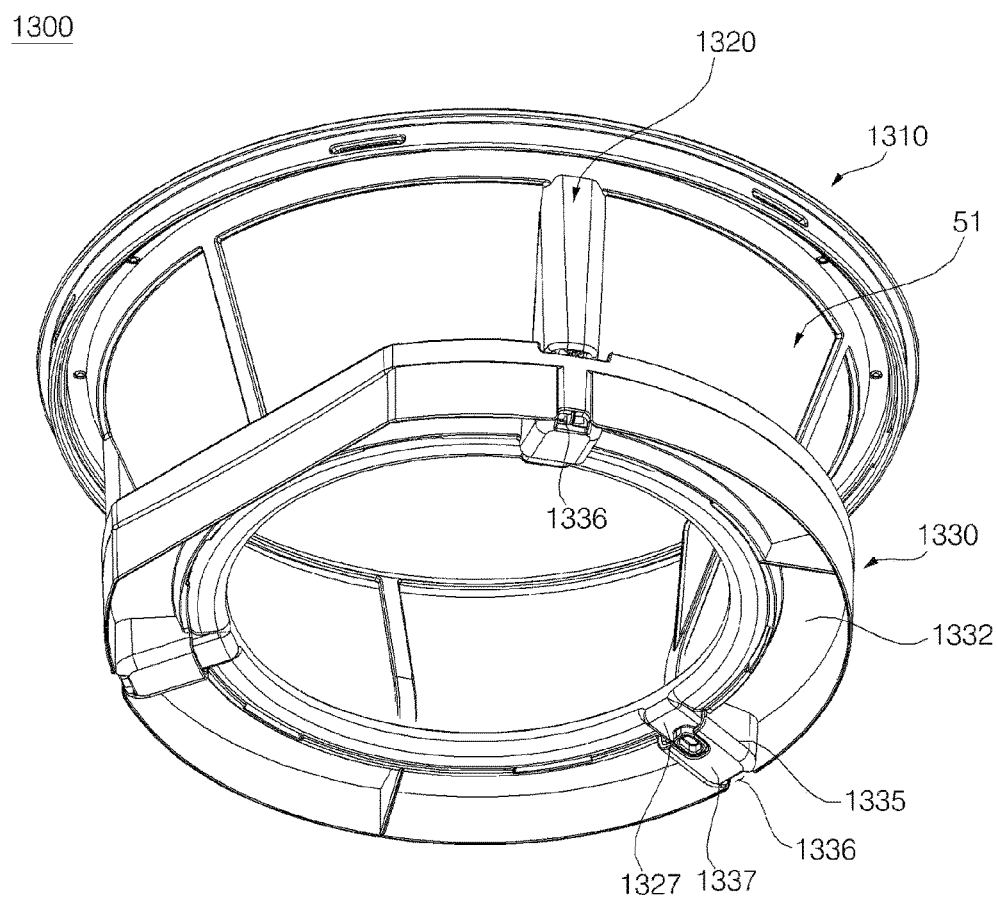
FIG. 12 is a perspective view of FIG. 11 viewed from bottom.
Figure 13:
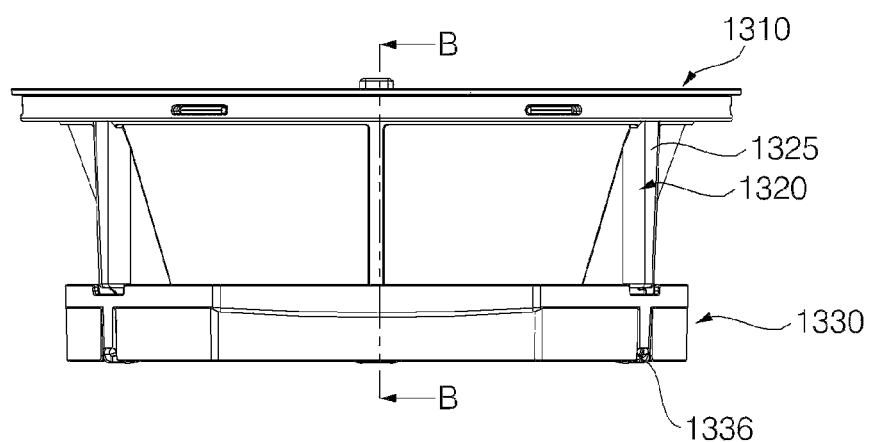
FIG. 13 is a front view of FIG. 11.
Figure 14:
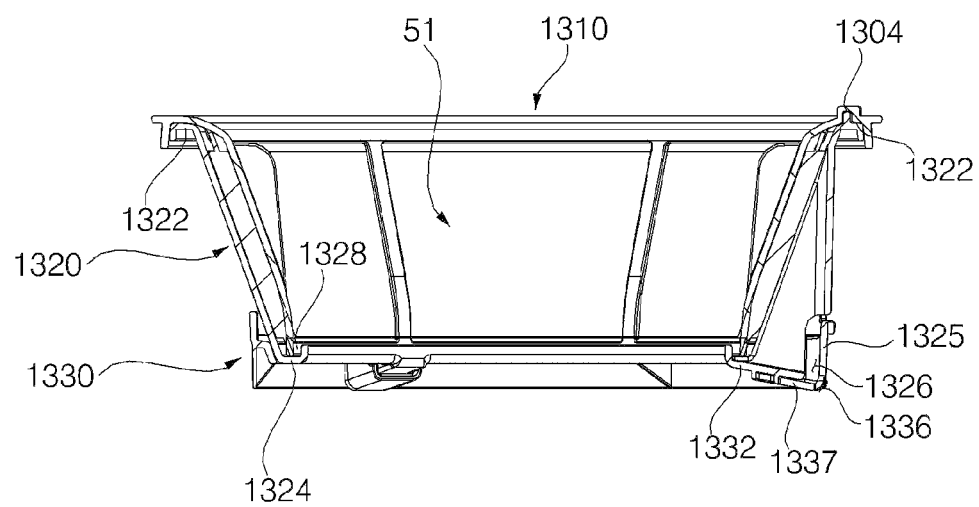
FIG. 14 is a cross-sectional view taken along line A-A of FIG. 13.
Figure 15:
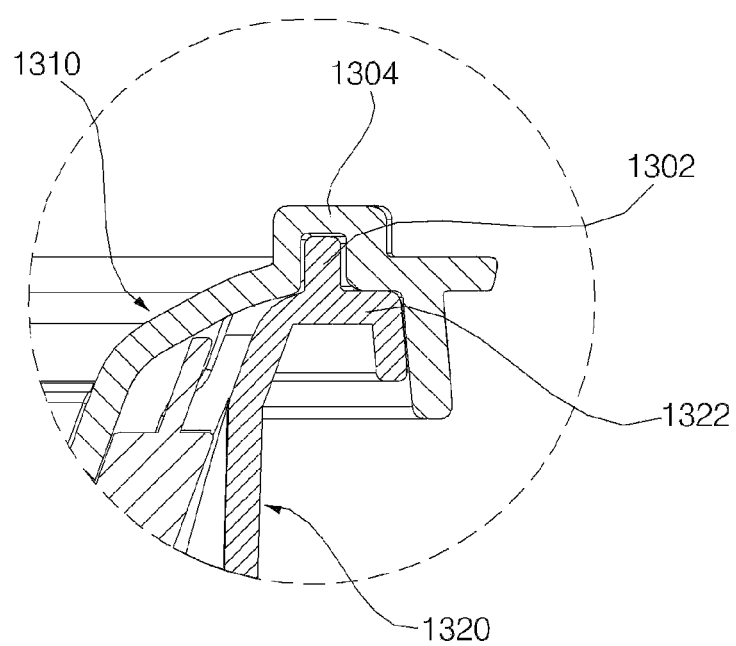
FIG. 15 is a magnified view of a portion B shown in FIG. 14.
Figure 16:
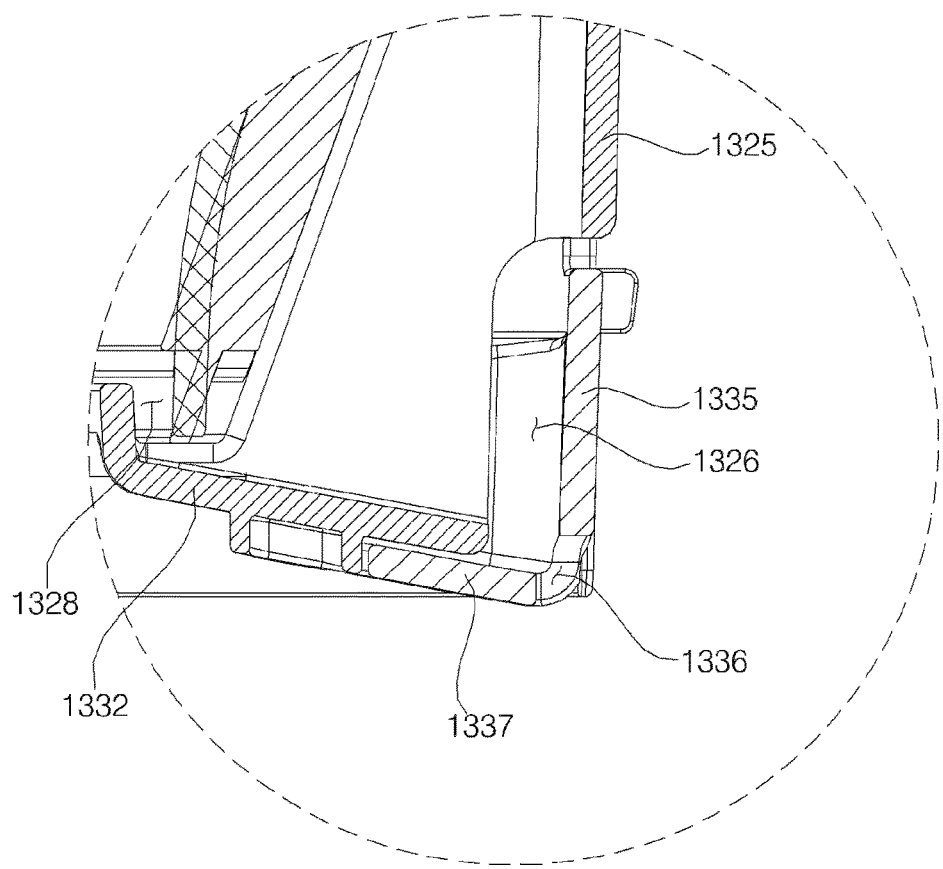
FIG. 16 is a magnified view of a portion C shown in FIG. 14.
Figure 17:
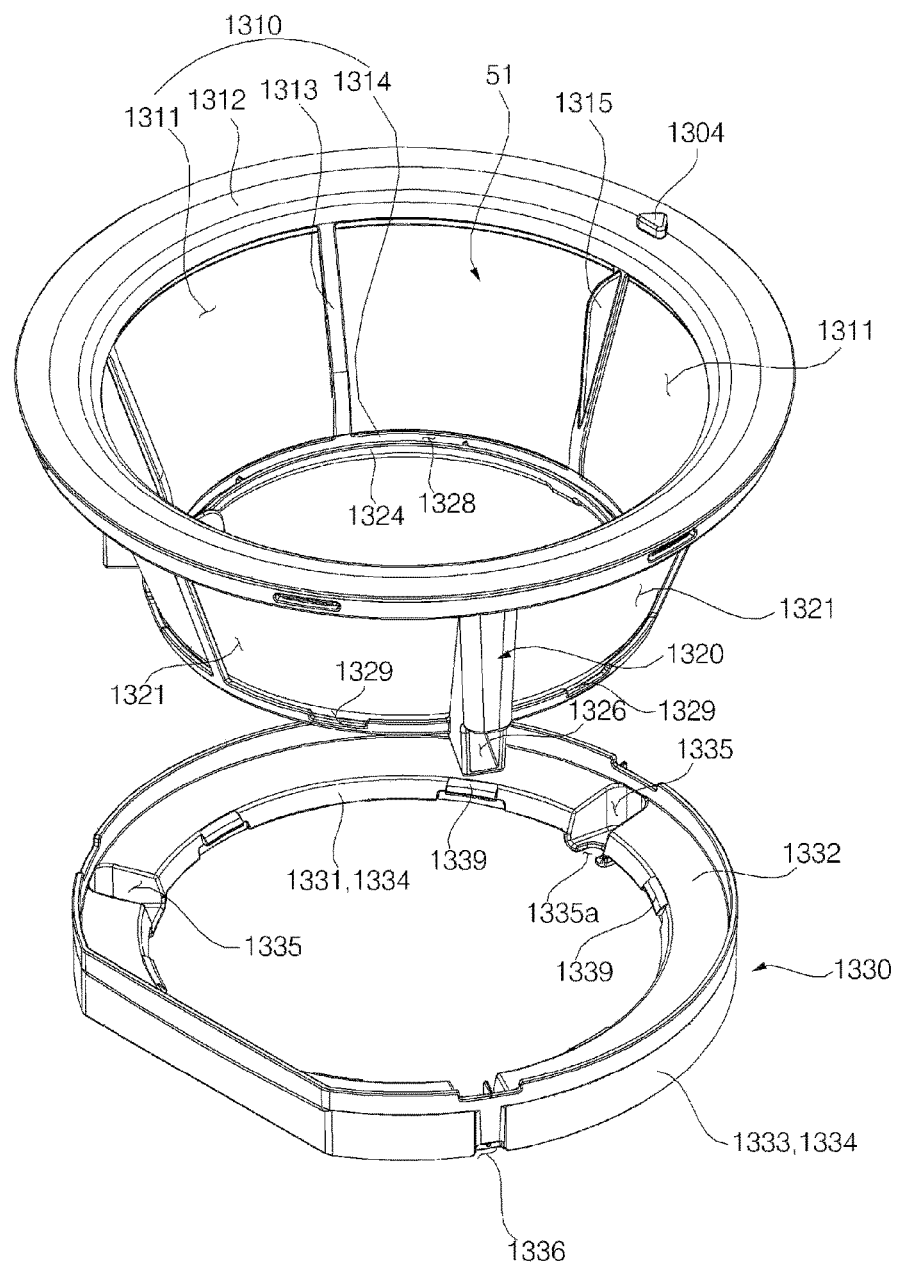
FIG. 17 is an exploded perspective view illustrating a portion of FIG. 11.
Figure 18:
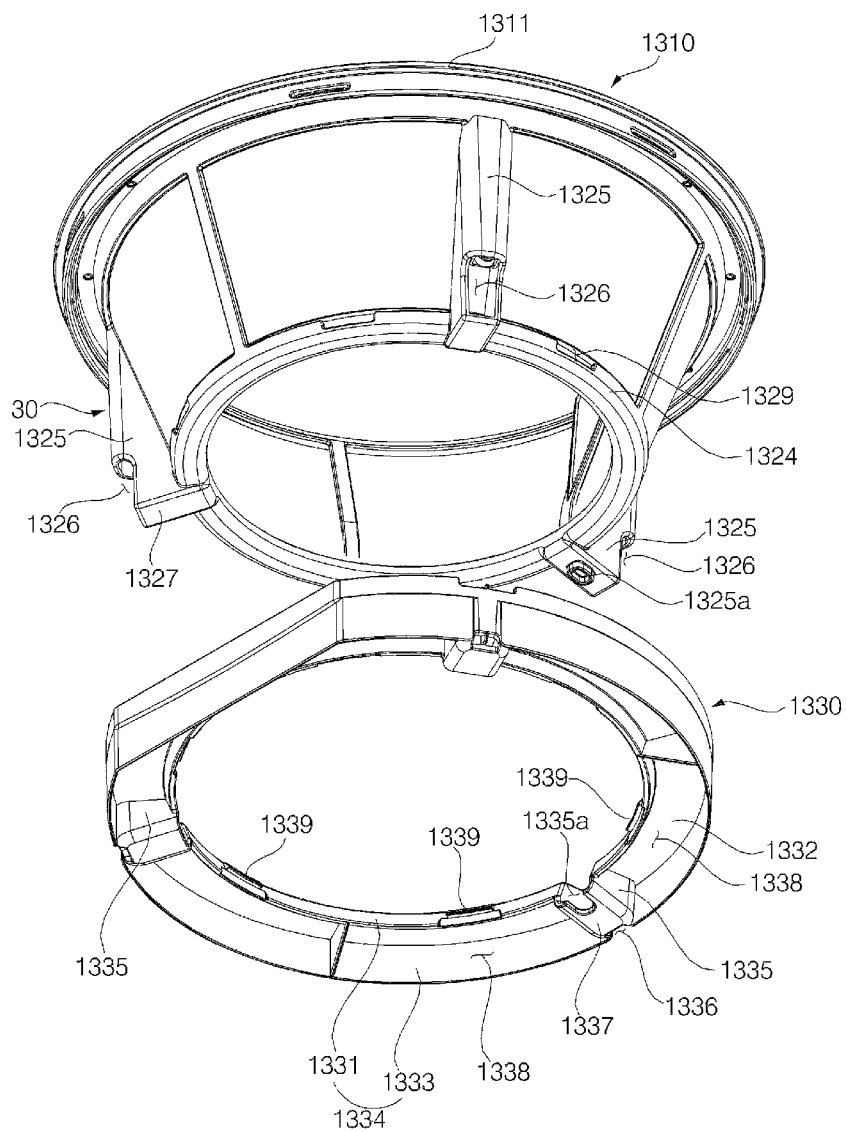
FIG. 18 is a perspective view of FIG. 17 viewed from bottom.
Figure 19:
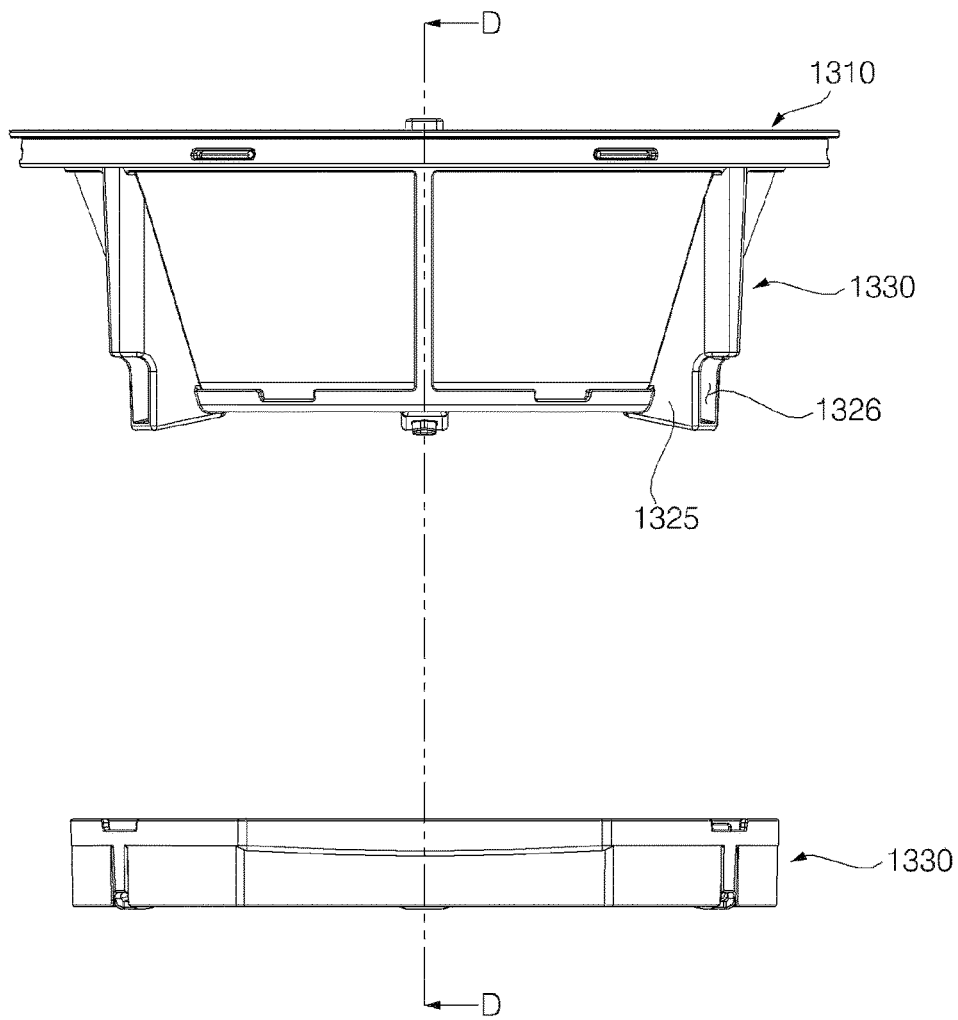
FIG. 19 is a front view of FIG. 17.
Figure 20:
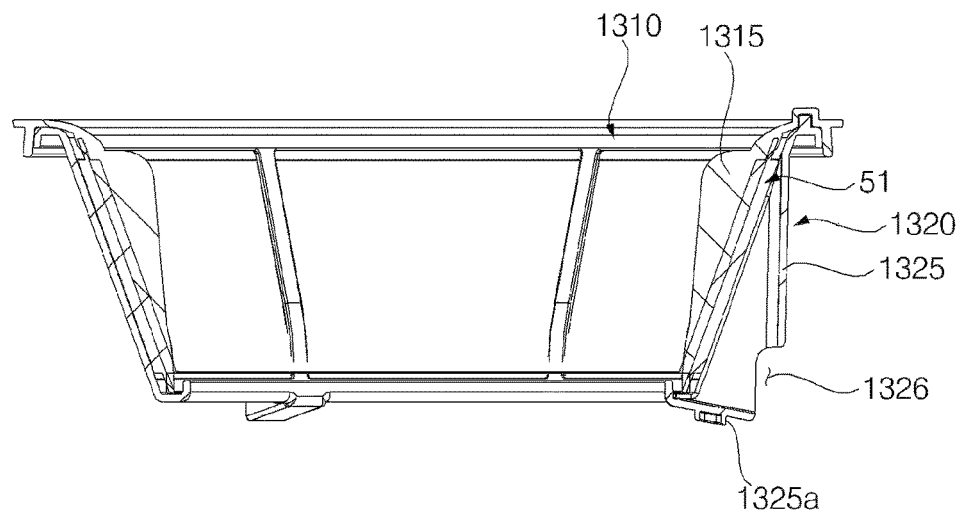
FIG. 20 is a cross-sectional view taken along line D-D of FIG. 19.
Figure 20:
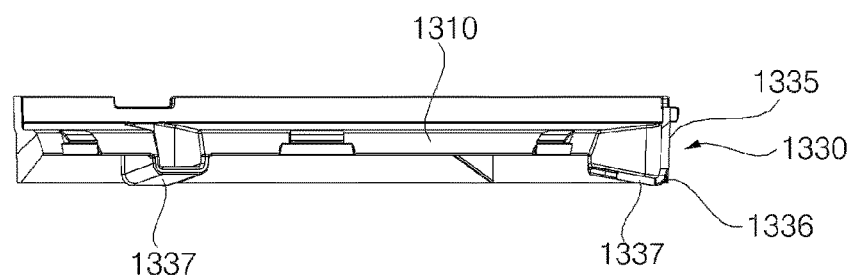

FIG. 9 is a cross-sectional view illustrating an air wash module from which a watering unit is removed in FIG. 4. FIG. 10 is a cross-sectional view of FIG. 9 when viewed from another direction. FIG. 11 is a perspective view illustrating a water tank humidification medium housing shown in FIG. 9. FIG. 12 is a perspective view of FIG. 11 viewed from bottom. FIG. 13 is a front view of FIG. 11. FIG. 14 is a cross-sectional view taken along line A-A of FIG. 13. FIG. 15 is a magnified view of a portion B shown in FIG. 14. FIG. 16 is a magnified view of a portion C shown in FIG. 14. FIG. 17 is an exploded perspective view illustrating a portion of FIG. 11. FIG. 18 is a perspective view of FIG. 17 viewed from bottom. FIG. 19 is a front view of FIG. 17. FIG. 20 is a cross-sectional view taken along line D-D of FIG. 19.

Hereinafter, a water tank humidification medium housing will be described in more detail with reference to the accompanying drawings.

In this embodiment, a housing in which the water tank humidification medium 51 among the humidification medium 50 is installed may be defined as a water tank humidification medium housing 1300.

In this embodiment, the water tank humidification medium 51 may be disposed to be spaced from water stored in the water tank 300. Since the water tank humidification medium 51 is separate from water, the humidification medium may be maintained at a dry state when not used.

When the water tank is full of water, the lower end of the water tank humidification medium 51 may be located higher than the water surface of the water tank 30.

Also, the water tank humidification medium housing 1300 in which the water tank humidification medium 51 is installed may be disposed to be spaced from water.

In this embodiment, the water tank humidification medium housing 1300 may be disposed in the water tank 300. Particularly, the water tank humidification medium housing 1300 may be disposed inside the air wash inlet 31. In this embodiment, the water tank humidification medium housing 1300 may be placed in the visual body 210, and may be located inside the water tank 300. Unlike this embodiment, the water tank humidification medium housing 1300 may be installed in the water tank 300.

The water tank humidification medium housing 1300 may allow air entered through the air wash inlet 31 to pass therethrough. The water tank humidification medium 51 may humidify the passing air.

Air passing the air wash inlet 31 may flow from the outside of the water tank 300 to the inside of the water tank 300.

The water tank humidification medium housing 1300 may provide moisture for air flowing in the water tank humidification medium 51, and may cover the upper side of the water tank 300 to prevent water from flowing out of the water tank 300.

For example, when an external impact is applied, water stored in the water tank 300 may flow out of the water tank 300. For example, when the air wash module 200 is separated and moved, water of the water tank 300 may flow out. For example, when the base body 110 may incline, water of the water tank 300 may flow out.

In order to prevent this, the water tank humidification medium housing 1300 may be adhered closely to an upper edge of the water tank 300, and thus, the water tank 300 can be inhibited from overflowing.

In this embodiment, the lower end of the water tank humidification medium housing 1300 may be located inside the water tank 300. The lower end of the water tank humidification medium 51 may also be located inside the water tank 300.

Also, the lower end of the water tank humidification medium housing 1300 may overlap the upper end of the water tank 300. The lower end of the water tank humidification medium 51 may also overlap the upper end of the water tank 300.

The overlapping may prevent water of the water tank 300 from flowing out of the air wash inlet 31. The overlapping may allow air flowing into the air wash inlet 31 to necessarily pass through the water tank humidification medium 51.

In this embodiment, both upper and lower ends of the water tank humidification medium 51 may overlap the water tank 300. Also, both upper and lower ends of the water tank humidification medium housing 1300 may overlap the water tank 300.

When the water tank humidification medium housing 1300 is placed in the visual body 210, the lower end of the water tank humidification medium housing 1300 may be adhered closely to the upper edge of the water tank 300. Unlike this embodiment, the water tank humidification medium housing 1300 may also be coupled to or combined with the upper end of the water tank 300 to perfectly inhibit the overflowing.

The upper end of the water tank humidification medium housing 1300 may be located outside the water tank 300, and the lower end thereof may be located inside the water tank 300. Also, the upper end of the water tank humidification medium 51 may be located outside the water tank 300, and the lower end thereof may be located inside the water tank 300.

When viewed from the front, the exterior shape of the water tank humidification medium housing 1300 may be obliquely formed. When viewed from the front, the exterior shape of the water tank humidification medium 51 may be obliquely formed.

In this embodiment, overflowing may be prevented by adhering a portion of the water tank humidification medium housing 1300 closely to the water tank 300.

The water tank humidification medium housing 1300 may include an inner medium frame 1310 located inside the water tank humidification medium 51, supporting the water tank humidification medium 51, and including an inner medium inlet 1311 formed therein and allowing air to pass, an outer medium frame 1320 located outside the water tank humidification medium 51, supporting the water tank humidification medium 51, and including an outer medium inlet 1321 formed therein and allowing air to pass, and an overflowing preventing cover 1330 coupled to one of the inner medium frame 1310 and the outer medium frame 1320 and adhering closely to the water tank 300 to prevent overflowing of the water tank 300.

The water tank humidification medium 51 may be disposed between the inner medium frame 1310 and the outer medium frame 1320. The water tank humidification medium 51 may cover the air wash inlet 31. The water tank humidification medium 51 may be formed in a form of ring. In this embodiment, the water tank humidification medium 51 may be formed in a form of hopper having a gradually larger horizontal sectional area at an upper side than at a lower side. The water tank humidification medium 51 may be obliquely disposed with respect to a vertical direction. The inclination of the water tank humidification medium 51 may be determined in consideration of the air flow direction.

Air flowing to the air wash inlet 31 through the connection flow passage 103 may obliquely flow upward, instead of flowing in a horizontal direction. The water tank humidification medium 51 that is obliquely disposed may orthogonally cross the air flow direction.

When the air flow and the water tank humidification medium 51 orthogonally cross each other, air may be prevented from being driven into a specific portion of the water tank humidification medium 51, and air may uniformly pass through the whole area of the water tank humidification medium 51.

A humidification medium fixing member may be disposed in at least one of the outer medium frame 1320 and the inner medium frame 1310 to fix the water tank humidification medium 51.

In this embodiment, the humidification medium fixing member may include a protrusion and a groove.

The humidification medium fixing member may include a fixing protrusion 1302 formed on one of the inner medium frame 1310 and the outer medium frame 1320, and a fixing groove 1304 formed in the other of the inner medium frame 1310 and the outer medium frame 1320 and receiving the fixing protrusion 1304.

In this embodiment, the fixing protrusion 1302 may be formed on the outer medium frame 1320, and the fixing groove 1304 may be formed in the inner medium frame 1310. Unlike this embodiment, the positions of the fixing protrusion 1302 and the fixing groove 1304 may be switched. The water tank humidification medium 51 may be disposed between the fixing protrusion 1302 and the fixing groove 1304, and the water tank humidification medium 51 may be fixed when the fixing protrusion 1302 is fitted into the fixing groove 1304.

The fixing protrusion 1302 and the fixing groove 1304 may prevent the water tank humidification medium 51 from moving between the inner medium frame 1310 and the outer medium frame 1320.

In this embodiment, a portion of the inner medium frame 1310 may protrude upward to form the fixing groove 1304 in order to the fixing groove 1304.

The fixing groove 1304 may be downwardly opened, and the fixing protrusion 1302 may upwardly protrude.

Due to the coupling between the fixing protrusion 1302 and the fixing groove 1304, there may also be a coupling effect between the inner medium frame 1310 and the outer medium frame 1320.

The inner medium inlet 1311 passing air may be formed in the inner medium frame 1310. The outer medium inlet 1321 passing air may be formed in the outer medium frame 1320.

The inner medium inlet 1311 and the outer medium inlet 1321 may be formed so as to receive air in all direction of 360 degrees of a circumference thereof.

The inner medium inlet 1311 and the outer medium inlet 1321 may be disposed to face each other.

The inner medium frame 1310 may have an upper diameter larger than a lower diameter thereof. The outer medium frame 1320 may have an upper diameter larger than a lower diameter thereof. In this embodiment, the water tank humidification medium housing 1300 may be formed in a form of hopper on the whole.

The outer medium frame 1320 and the inner medium frame 1310 may be coupled to each other by press-fitting. When the outer medium frame 1320 and the inner medium frame 1310 may be press-fitted, the water tank humidification medium 51 may be fixed.

The overflowing preventing cover 1330 may cover a portion of the upper side surface of the water tank 300 to prevent overflowing of the water tank 300. Also, the overflowing preventing cover 1330 may serve to prevent water flowing down from the upper side from directly dropping on the water surface of the water tank 300.

The overflowing preventing cover 1330 may be assembled with the lower sides of the outer medium frame 1320 and the inner medium frame 1310. The overflowing preventing cover 1330 may be press-fitted to at least one of the outer medium frame 1320 and the inner medium frame 1310.

The outer medium frame 1320 and the inner medium frame which are assembled may be defined as a medium frame assembly.

The upper end of the medium frame assembly may be placed on the visual body 210. Water flowing down along the visual body 210 may flow along the medium frame assembly.

The overflowing preventing cover 1330 may be disposed at a lower end of the medium frame assembly, and may support the medium frame assembly. The overflowing preventing cover 1330 may temporarily store water that flows down, and may guide temporarily stored water to the inner side surface of the water tank 300. In this embodiment, the overflowing preventing cover 1330 may provide a portion of the dropping water preventing flow passage.

The overflowing preventing cover 1330 may guide water that flows down and may minimize the noise of dropping water. The overflowing preventing cover 1330 may support at least a portion of the lower end of the medium frame assembly. In this embodiment, the overflowing preventing cover 1330 may cover the whole of the lower end of the medium frame assembly, and water may be prevented from directly dropping down on the water surface of the water tank 300.

When viewed from top, the overflowing preventing cover 1330 may be formed in a form of donut. The upper side surface of the overflowing preventing cover 1330 may collect water flowing down from the medium frame assembly, and may guide water to the inner side surface of the water tank 300. The lower side surface of the overflowing preventing cover 1330 may interrupt overflowing of the water tank 300 by blocking an inner edge of the water tank 300.

The inner medium frame 1310 may include an inner upper frame 1312 placed on the visual body 210, an inner vertical frame 1313 downwardly extending from the inner upper frame 1312 and forming the inner medium inlet 1311, and an inner lower frame 1314 connected to the inner vertical frame 1313 and seated on the upper side surface of the overflowing preventing cover 1330.

The inner vertical frame 1313 may be disposed in plurality between the inner upper frame 1312 and the inner lower frame 1314. The inner medium inlet 1311 may be formed among the inner upper frame 1312, the inner lower frame 1314, and the inner vertical frame 1313.

The inner upper frame 1312 may be formed such that the upper side surface thereof faces the inside. In this embodiment, the upper side surface of the inner upper frame 1312 may be formed into a curved surface, and may guide water, flowing down along the visual body 210, to the water tank humidification medium 51.

A handle 1315 may be formed on the inner vertical frame 1313. The handle 1315 may be formed in plurality. The handle 1315 may inwardly protrude from the inner vertical frame 1313. A user may lift the whole of the water tank humidification medium housing 1300 using the handle 1315.

The inner upper frame 1312 may be formed in a form of ring, and the inner side thereof may be opened. The inner lower frame 1314 may be formed in a form of ring, and the inner side thereof may be opened.

The inner upper frame 1312 may more outwardly protrude in a radial direction than the outer medium frame 1320 so as to be placed in the lower guide groove 217 of the visual body 210.

The outer medium frame 1320 may have a structure similar to the inner medium frame 1310. Similarly to the inner medium frame 1310, the outer medium frame 1320 may include an outer medium inlet 1321, an outer upper frame 1322, an outer vertical frame 1323, and an outer lower frame 1324.

The outer lower frame 1324 may have a storage space 1328 formed therein. The storage space 1328 may temporarily store water that flows down. The storage space 1328 may be formed in a form of ring. A vertical wall may be formed inside the outer lower frame 1324, and may prevent water from flowing into the inside. Water of the storage space 1328 may flow to an outer medium guide 1325 described later.

Unlike the inner medium frame 1310, the outer medium frame 1320 may further include an outer medium guide 1325 that connects the outer upper frame 1322 and the outer lower frame 1324.

The outer medium guide 1325 may support the outer upper frame 1322 and the outer lower frame 1324. The outer medium guide 1325 may have an empty space formed therein. The outer medium guide 1325 may be connected to the storage space 1328.

The outer medium guide 1325 may discharge water of the water tank humidification medium 51 to an overflow preventing guide 1330.

An outer medium guide hole 1326 may be formed at a lower side end of the outer medium guide 1325 to discharge internal water to the overflow preventing guide 1330. The outer medium guide hole 1326 may have a stepped structure formed in a radial direction. Accordingly, the outer medium guide hole 1326 may be formed in an inward direction. The overflow preventing guide 1330 may match the outer medium guide 1325 in shape.

The undersurface of the outer medium guide 1325 may be formed into an inclination surface 1327. The inside of the inclination surface 1327 may be high, and the outside thereof may be low. Accordingly, water of the outer medium guide 1325 may be guided to the outer medium guide hole 1326 along the inclination surface 1327. The outer medium guide hole 1326 may be disposed at the end of the inclination surface 1327.

In this embodiment, three outer medium guides 1325 may be disposed. The outer medium guides 1325 may be radially disposed at an equal interval.

Water of the storage space 1328 may be moved to the outer medium guide 1325 by the self-weight of water. Water of the storage space 1328 may flow in a circumferential direction, and then may move to the outer medium guide 1325. Thereafter, water may be discharged to the overflowing preventing cover 1330 through the outer medium guide hole 1326.

Due to the structure of the storage space 1328, the outer medium guide 1325, the outer medium guide hole 1326, and the overflowing preventing cover 1330, water may be prevented from directly dropping on the water surface of the water tank 300 from the water tank humidification medium housing 1300.

The overflowing preventing cover 1330 may include a cover part 1332 covering the upper portion of the water tank 300, a barrier 1334 connected to the cover part 1332 and bent from the cover part 1332 to form a reception space 1338, a cover insertion groove 1335 formed in the cover part 1332 and receiving the outer medium guide 1325, and a cover hole 1336 formed in the cover insertion groove 1335 and communicating with the inside of the water tank 300 to discharge water.

The cover part 1332 may be disposed under the medium frame assembly. The cover part 1332 may be disposed inside the water tank 300. The cover part 1332 may cover a portion of the upper side of the water tank 300. In this embodiment, the cover part 1332 may be formed along the inner side surface of the water tank 300.

The cover insertion groove 1335 may be concavely formed at a lower side of the cover part 1332. The outer medium guide 1325 may be inserted into the cover insertion groove 1335. The cover insertion groove 1335 may be concavely formed in a vertical direction, and the outer medium guide 1325 may be vertically inserted into the cover insertion groove 1335.

The outer medium guide 1325 inserted into the cover insertion groove 1335 may be limited in lateral movement. The cover insertion groove 1335 may be spaced from the outer medium guide hole 1326 by a certain gap.

The cover hole 1336 may be formed in the cover insertion groove 1335. The cover hole 1336 may be penetratively formed in a radial direction. The cover hole 1336 may communicate with the inside of the water tank 300. The cover hole 1336 may be formed toward the inner side surface of the water tank 300. Water discharged from the cover hole 1336 may move along the inner side surface of the water tank 300.

The undersurface of the cover insertion groove 1335 may be formed into an inclination surface 1337. The inclination surface 1337 may correspond to the inclination surface 1327 of the outer medium guide 1325.

A fitting groove 1335a may be formed in at least one of the cover insertion grooves 1335, and a fitting part 1325a corresponding to the fitting groove 1335 may be formed on the outer medium guide 1325.

The fitting part 1325a may downwardly protrude, and may be inserted into the fitting groove 1335a in a vertical direction. The fitting part 1325a and the fitting groove 1335a may be used as a location determination part that allows a user to check the coupling location of the outer medium frame 1320 and the overflowing preventing cover 1330. When the fitting part 1325a and the fitting groove 1335a do not correspond to each other, the outer medium frame 1320 and the overflowing preventing cover 1330 may not be assembled.

The cover part 1302 may adhere closely to the inner side surface of the water tank 300. The cover part 1302 may adhere closely to an upper edge of the water tank 300. The cover part 1302 may overlap the upper end of the water tank 300. In this embodiment, the cover part 1302 may adhere closely to the inner side surface of the water tank 300, and may adhere closely to the upper edge of the water tank 300.

The inside of the inclination surface 1337 may be high, and the outside thereof may be low. The cover hole 1336 may be disposed at the end of the inclination surface 1337. Water discharged into the cover hole 1336 may contact the inner side surface of the water tank 300. Water may be guided to the inner side surface of the water tank 300 through the inclination surfaces 1327 and 1337.

The cover part 1332 may be obliquely formed. The outside of the cover part 1332 may be high and the inside thereof may be low. The inclination of the cover part 1332 may inhibit water over the cover part 1332 from flowing to the outside of the cover part 1332. Water on the upper side surface of the cover part 1332 may flow to the inside along the slope.

Water flowing along the upper side of the cover part 1332 may be guided to the storage space 1328. Accordingly, water flowing down along the upper side surface of the cover part 1332 may be guided to the inner side surface of the water tank 300 through the storage space 1328, the outer medium guide hole 1326, and the cover hole 1336. Thus, water that flows down may be prevented from directly dropping down on the water surface of the water tank 300.

The barrier 1334 may form a reception space 1338 together with the cover part 1332. The reception space 1338 may be formed under the cover part 1332. When water of the water tank 300 fluctuates, the reception space 1338 may receive water fluctuating along the inner side wall of the water tank 300, and may guide water to a lower side of the water tank 300.

The barrier 1334 may include an inner barrier 1331 and an outer barrier 1333.

The inner barrier and 1331 and the outer barrier 1333 may downwardly bent from the cover part 1332. The inner barrier 1331 may be formed along the inner edge of the cover part 1332, and may be downwardly bent. The outer barrier 1333 may be formed along the outer edge of the cover part 1332, and may be downwardly bent.

The outer barrier 1333 may adhere closely to the inner side surface of the water tank 300.

The inner barrier 1331 may adhere closely to the outer medium frame 1320. More specifically, the inner barrier 1331 may adhere closely to the outer lower frame 1324.

The inner barrier 1331 and the outer lower frame 1324 may be coupled to each other. A stopping protrusion 1339 may be formed on any one of the inner barrier 1331 and the outer lower frame 1324, and a stopping groove 1329 may be formed in the other. In this embodiment, the stopping protrusion 1339 may be formed on the inner barrier 1331, and the stopping groove 1329 may be formed in the outer lower frame 1324.

In this embodiment, the overflowing preventing cover 1330 may be located inside the water tank 300, and the outer barrier 1333 may adhere closely to the inner side surface of the water tank 300.

Accordingly, when water stored in the water tank 300 fluctuates, water may rise along the inner side surface of the water tank 300, and then may flow along the outer barrier 1333, the cover part 1332, and the inner barrier 1331. That is, water rising along the inner side surface of the water tank 300 may flow downward from the reception space 1338, and then may be guided to the center of the water tank 300.

Thus, the overflowing preventing cover 1330 may prevent the water tank 300 from overflowing.

Also, due to the configuration of the inner upper frame 1312, the storage space 1328, the outer medium guide hole 1326, the cover part 1332 and the cover hole 1336, the water tank humidification medium housing 1300 may provide the dropping water preventing flow passage that prevents water flowing down from the visual body 210 from directly dropping down on the water surface of the water tank 300.

A humidification and air cleaning apparatus according to an exemplary embodiment of the present invention has at least one of the following effects.

First, the humidification medium can be maintained at a dry state when humidification mode is not used.

Second, when not used, the humidification medium is maintained at a dry state. Accordingly, the propagation of molds or bacteria can be minimized.

Third, when the humidification medium is wetted, water remaining after wetting the humidification medium may not generate a noise of dropping water, and may be restored into the water tank.

Fourth, since the water tank humidification medium covers the air wash inlet, water can be prevented from leaking out of the air wash inlet.

Fifth, since the lower end of the water tank humidification medium housing or the water tank humidification medium is disposed inside the water tank, water remaining after wetting the water tank humidification medium can be prevented from leaking out of the water tank.

Sixth, since the water tank humidification medium housing is separable from the visual body, the water tank humidification medium can be separated and washed.

Seventh, the guide disposed in the water tank humidification medium housing can guide water flowing down from the visual body to the inside of the water tank.

Eighth, since the water tank humidification medium covers the air wash inlet, the water tank humidification medium can be quickly dried.

The effects of the present invention are not limited to the above; other effects that are not described herein will be clearly understood by the persons skilled in the art from the following claims.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus comprising:
   a water tank to store water, the water tank having a bottom wall and a side wall extending upward from the bottom wall;
   an air wash inlet formed at the side wall of the water tank to receive external air into the water tank;
   a water tank humidification medium covering at least a portion of the air wash inlet, the water tank humidification medium being formed of a water absorbent material to humidify air passing through the air wash inlet; and
   a watering housing disposed in the water tank, the watering housing having a bottom surface that is open to draw the water of the water tank therein and a nozzle to spray the drawn water toward the outside in a radial direction,
   wherein the water tank humidification medium is spaced apart from a portion of the water tank where the water is stored and is wetted by the sprayed water,
   wherein the water tank humidification medium is formed in a shape of a hopper having a gradually larger horizontal sectional area at an upper side than at a lower side.

2. The apparatus of claim 1, wherein air passing through the air wash inlet is pressurized so as to flow from the outside to the inside of the water tank.

3. The apparatus of claim 1, wherein the air wash inlet is formed along a circumference of the water tank, and the water tank humidification medium covers the entirety of the air wash inlet.

4. The apparatus of claim 1, wherein the water tank humidification medium comprises a lower end that is disposed inside the water tank.

5. The apparatus of claim 1, wherein the water tank humidification medium comprises an upper end that is disposed outside the water tank and a lower end that is disposed inside the water tank.

6. The apparatus of claim 1, wherein the water tank humidification medium comprises a lower end that is overlapped with a portion of the water tank.

7. The apparatus of claim 1, further comprising:
   a water tank humidification medium housing to house the water tank humidification medium,
   wherein the water tank humidification medium housing is separably attached to the water tank.

8. The apparatus of claim 7, wherein the water tank humidification medium housing comprises a lower end that is disposed inside the water tank.

9. The apparatus of claim 7, wherein the water tank humidification medium housing comprises an upper end that is disposed outside the water tank and a lower end that is disposed inside the water tank.

10. The apparatus of claim 7, wherein the water tank humidification medium housing comprises a lower end that is overlapped with the water tank.

11. The apparatus of claim 1, further comprising a visual body that is formed of a transparent material, wherein the visual body forms at least a portion of the water tank.

12. The apparatus of claim 11, wherein the nozzle sprays the stored water to an inner side surface of the visual body,
   wherein the air wash inlet is disposed below the visual body,
   wherein the water tank humidification medium is wetted by water flowing down along an inner surface of the visual body, and
   wherein air passing through the air wash inlet is humidified through the wetted water tank humidification medium.

13. The apparatus of claim 11, wherein the water tank humidification medium housing is separably attached to the visual body.

14. The apparatus of claim 12, wherein the visual body comprises a reservoir to store the water that has flowed down along the inner surface of the visual body, at least part of the water tank humidification medium housing being disposed on the reservoir.

15. The apparatus of claim 14, wherein the water tank humidification medium housing comprises a guide, the guide being disposed over the reservoir and inclined in a direction toward the inside of the water tank.

16. The apparatus of claim 7, wherein the water tank humidification medium housing comprises:
   an inner medium frame having an inner medium inlet formed therein for air to pass therethrough, and
   an outer medium frame having an outer medium inlet formed therein for air to pass therethrough,
   whereby the water tank humidification medium is disposed between the inner frame and the outer frame so that air passing through the water tank humidification medium sequentially passes the air wash inlet, the outer medium inlet, and the inner medium inlet.

17. The apparatus of claim 1, wherein when the water tank is full of water, a lower end of the water tank humidification medium is located above the water surface.

* * * * *